United States Patent
Ito et al.

(10) Patent No.: US 8,262,164 B2
(45) Date of Patent: Sep. 11, 2012

(54) SEAT APPARATUS AND SEAT ADJUSTMENT MECHANISM FOR THE SAME

(75) Inventors: Sadao Ito, Anjo (JP); Toshiaki Nagata, Kariya (JP); Yuji Arakawa, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 383 days.

(21) Appl. No.: 12/717,445

(22) Filed: Mar. 4, 2010

(65) Prior Publication Data
US 2010/0244525 A1 Sep. 30, 2010

(30) Foreign Application Priority Data
Mar. 27, 2009 (JP) ................................. 2009-078748

(51) Int. Cl.
*B60N 2/00* (2006.01)
(52) U.S. Cl. ........... 297/354.11; 297/354.12; 297/354.1; 297/408; 297/362.13
(58) Field of Classification Search ............... 297/354.1, 297/354.11, 354.12, 408, 362.13
See application file for complete search history.

(56) References Cited

U.S. PATENT DOCUMENTS

| | | | | |
|---|---|---|---|---|
| 3,284,135 A * | 11/1966 | Hiramatsu | ............... | 297/362.13 |
| 4,372,608 A * | 2/1983 | Hotta | ................ | 297/362.13 |
| 4,469,374 A * | 9/1984 | Kashihara et al. | ......... | 297/284.4 |
| 4,626,028 A * | 12/1986 | Hatsutta et al. | ............... | 297/289 |
| 4,934,755 A * | 6/1990 | Berghoff | ................ | 297/284.1 |
| 4,977,973 A * | 12/1990 | Takizawa | ................ | 180/271 |
| 5,370,443 A * | 12/1994 | Maruyama | .............. | 297/284.1 |
| 7,845,729 B2 * | 12/2010 | Yamada et al. | ........... | 297/284.1 |
| 8,042,415 B2 * | 10/2011 | Ito | ................ | 74/89.23 |
| 2004/0195895 A1 * | 10/2004 | Sedlatschek et al. | ......... | 297/408 |
| 2005/0035642 A1 * | 2/2005 | Hake et al. | ................ | 297/396 |
| 2008/0252128 A1 | 10/2008 | Nishikawa et al. | | |

FOREIGN PATENT DOCUMENTS

| JP | 2007-6948 A | 1/2007 |
|---|---|---|
| JP | 2008-254645 A | 10/2008 |
| WO | WO 2009/004972 A1 | 1/2009 |

OTHER PUBLICATIONS

U.S. Appl. No. 12/531,556, filed Sep. 16, 2009, Yamada et al.

* cited by examiner

*Primary Examiner* — Laurie Cranmer
(74) *Attorney, Agent, or Firm* — Buchanan Ingersoll & Rooney PC

(57) ABSTRACT

A seat adjustment mechanism, which adjusts an angle formed between first and second seat members rotatably connected to each other, includes a first link member adapted to be connected to the first seat member and including a first end rotatably supported by the first seat member, a second link member adapted to be rotatably connected to the second seat member and including a first end rotatably supported by the second seat member and a second end rotatably connected to the first link member, a drive device, and an extending and retracting device driven by the drive device and extending and retracting linearly, wherein one of the drive device and the extending and retracting device is rotatably connected to a second end of the first link member and the other of the drive device and the extending and retracting device is rotatably connected to the second seat member.

9 Claims, 14 Drawing Sheets

SEAT APPARATUS AND SEAT ADJUSTMENT MECHANISM FOR THE SAME

CROSS REFERENCE TO RELATED APPLICATIONS

This application is based on and claims priority under 35 U.S.C. §119 to Japanese Patent Application 2009-078748, filed on Mar. 27, 2009, the entire content of which is incorporated herein by reference.

TECHNICAL FIELD

This disclosure relates to a seat apparatus and a seat adjustment mechanism for the same, which tilts an upper seat back portion of a twofold seat back in a longitudinal direction of a vehicle.

BACKGROUND DISCUSSION

A known twofold seat back of a seat apparatus for a vehicle, which is disclosed in JP2008-254645A (hereinafter referred to as Reference 1, see paragraphs 0006, 0017, and 0018 and FIG. 4) is divided into an upper seat back portion supporting a seated occupant's shoulder blade and a lower seat back portion supporting the seated occupant's lumbar part. The upper seat back portion includes upper frames each serving as a first seat member and the lower seat back portion includes lower frames each serving as a second seat member. Each of the upper frames of the upper seat back portion and each of the lower frames of the lower seat back portion are rotatably connected at respective sides thereof to each other by a hinge shaft. A seat back angle adjustment mechanism (seat back adjustment mechanism) is arranged between the upper and lower frames and in a position deviated rearward from the hinge shaft. The seat back angle adjustment mechanism includes ball screws (extending and retracting device), guide members (extending and retracting device), a shaft (drive device), operating members (extending and retracting device), and a drive motor (drive unit) and adjusts a tilt angle of the seat back upper portion relative to the seat back lower portion.

The guide members are rotatably connected to the both side ends of the lower frame of the lower seat back portion by means of hinge pins. Each of the ball screws is screwed with each of the guide members so as to be rotatable. The ball screws are connected to each other by the shaft arranged therebetween so as to rotate in a synchronized manner. The operating members are rotatably connected to the both side ends of the upper frames of the upper seat back portion by means of hinge pins. An upper end portion of each of the ball screws is rotatably screwed with each of the operating members. Further, the drive motor driving the ball screws is attached to one of the guide members. According to the seat back angle adjustment mechanism configured as described above, the drive motor is driven to linearly move the ball screws in a vertical direction of the vehicle, thereby rotating the upper frames of the upper seat back portion about the hinge shafts. Accordingly, the upper seat back portion tilts relative to the lower seat back portion.

A known seat back of a seat apparatus for a vehicle, disclosed in JP2007-006948A (hereinafter referred to as Reference 2, see paragraph 0015, FIGS. 2 and 3) includes a twofold seat back having a seat back upper portion and a seat back lower portion. Further, the seat back is provided with a seat back tilting mechanism (seat back adjustment mechanism). The seat back tilting mechanism includes a feed screw (extending and retracting device), a nut (extending and retracting device), a housing (drive unit), an arm member (drive unit), and a motor (drive unit). The housing is fixed to the center of a lower support member of the lower seat back portion by a bracket. The nut is rotatably supported within the housing. The feed screw is rotatably screwed with the nut. The arm member is fixed to the center of an upper support member of the upper seat back portion by a bracket. An upper end portion of the feed screw is rotatably screwed with the arm member. Further, a motor rotating the nut is attached to the housing. According to the seat back tilting mechanism configured as described above, the motor is driven to linearly move the feed screw in a vertical direction of the vehicle, thereby rotating the upper seat back portion around hinge shafts rotatably connecting the upper and lower seat back portions at both sides thereof. Accordingly, the upper seat back portion tilts relative to the lower seat back portion accordingly.

In case of a collision of the vehicle, a large load is applied to the upper frame of the upper seat back portion due to an inertia force of the occupant in a forward or rearward moving direction of the vehicle. The seat back adjustment mechanism described in Reference 1 and Reference 2 is configured so that the upper frame of the upper seat back portion is rotated around the hinge shafts by a screw mechanism. Accordingly, in case of a front collision of the vehicle, a moment force, which is obtained by multiplying a load applied to the upper frame of the upper seat back portion by a distance between the upper frame and each of the hinge shafts acts on the hinge shaft. Further, a load obtained by dividing the moment force by a distance from the screw mechanism to the hinge shaft is applied to the screw mechanism.

In recent years, a longitudinal thickness of a seat for the vehicle is desired to be small because of an improvement of the appearance of the seat. Accordingly, the distance from the screw mechanism to the hinge shaft is designed to be short. In general, a ratio between the distance from the upper frame to the hinge shaft and the distance from the screw mechanism to the hinge shaft is approximately from seven to ten to one; therefore, the load applied to the screw mechanism is from seven to ten times as large as the load applied to the upper frame. Consequently, the screw mechanism requires a strong configuration that is not damaged even when a large load is applied to the screw mechanism. This increases the cost and weight of the seat back adjustment mechanism. In addition, the screw mechanism needs to generate a large driving force in order to tilt the upper seat back portion. Accordingly, the screw mechanism may additionally require a speed reduction gear mechanism performing a large speed reduction, therefore further increasing the cost weight of the seat back.

A need thus exists for a seat apparatus for a vehicle and a seat adjustment mechanism for the same, which are not susceptible to the drawback mentioned above.

SUMMARY

According to an aspect of this disclosure, a seat adjustment mechanism, which adjusts an angle formed between first and second seat members rotatably connected to each other, includes a first link member adapted to be connected to the first seat member and including a first end rotatably supported by the first seat member, a second link member adapted to be rotatably connected to the second seat member and including a first end rotatably supported by the second seat member and a second end rotatably connected to the first link member, a drive device, and an extending and retracting device driven by the drive device and extending and retracting linearly, wherein one of the drive device and the extending and retracting device is rotatably connected to a second end of the first link member and the other of the drive device and the extending and retracting device is rotatably connected to the second seat member, wherein assuming that a connecting point between the first link member and the second link member is defined as a connecting point P, a connecting point between the first seat member and the first link member is defined as a connecting point Q, a connecting point between the second seat member and the second link member is defined as a connecting point R, a connecting point between the first link member and one of the drive device and the extending and retracting device is defined as a connecting point S, a connecting point between the second seat member and the other of the drive device and the extending and retracting device is defined as a connecting point T, a line linearly passing through the connecting points Q and R is defined as a line L1, and a line linearly passing through the connecting points S and T is defined as a line L2, the first and second link members, the first link member and one of the drive device and the extending and retracting device, and the second link and the other of the drive device and the extending and retracting device are connected to each other so that a ratio a/b of a distance "a" from the connecting point P to the line L1 relative to a distance "b" from the connecting point P to the line L2 is set to be less than one, and wherein the drive device is driven to move the extending and retracting device linearly to rotate the first link member relative to the second link member to thereby generate a relative rotation between the first seat member and the second seat member in order to adjust the angle between the first and second seat members.

According to another aspect of the disclosure, a seat apparatus for a vehicle, which has a seat cushion and a seat back having first and second seat members rotatably connected to each other, includes a side frame mechanism serving as one of the first and second seat members, a lower end of which is tiltably connected to a rear end of a seat cushion frame arranged within the seat cushion, an upper cross-member serving as the other of the first and second seat members arranged at an upper portion of the side frame mechanism, and a seat adjustment mechanism adjusting an angle formed between the side frame mechanism and the upper cross-member rotatably connected to each other. The seat adjustment mechanism includes a first link member adapted to be connected to the first seat member and having a first end rotatably supported by the first seat member, a second link member adapted to be rotatably connected to the second seat member and including a first end rotatably supported by the second seat member and a second end rotatably connected to the first link member, a drive device, and an extending and retracting device driven by the drive device and extending and retracting linearly. According to the seat adjustment mechanism, one of the drive device and the extending and retracting device is rotatably connected to a second end of the first link member and the other of the drive device and the extending and retracting device is rotatably connected to the second seat member. Further, according to the seat adjustment mechanism, assuming that a connecting point between the first link member and the second link member is defined as a connecting point P, a connecting point between the first seat member and the first link member is defined as a connecting point Q, a connecting point between the second seat member and the second link member is defined as a connecting point R, a connecting point between the first link member and one of the drive device and the extending and retracting device is defined as a connecting point S, a connecting point between the second seat member and the other of the drive device and the extending and retracting device is defined as a connecting point T, a line linearly passing through the connecting points Q and R is defined as a line L1, and a line linearly passing through the connecting points S and T is defined as a line L2, the first and second link members, the first link member and one of the drive device and the extending and retracting device, and the second link member and the other of the drive device and the extending and retracting device are connected to each other so that a ratio a/b of a distance "a" from the connecting point P to the line L1 relative to a distance "b" from the connecting point P to the line L2 is set to be less than one. Moreover, according to the seat adjustment mechanism, the drive device is driven to linearly move the extending and retracting device to rotate the first link member relative to the second link member to thereby generate a relative rotation between the first seat member and the second seat member in order to adjust the angle between the first and second seat members; furthermore, the connecting point Q and the connecting point S are adapted to be fixed respectively at rear and front portions of the side frame mechanism in an inner side thereof and the upper cross-member is connected to the side frame mechanism and driven to be tiltable forward relative to the side frame mechanism.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
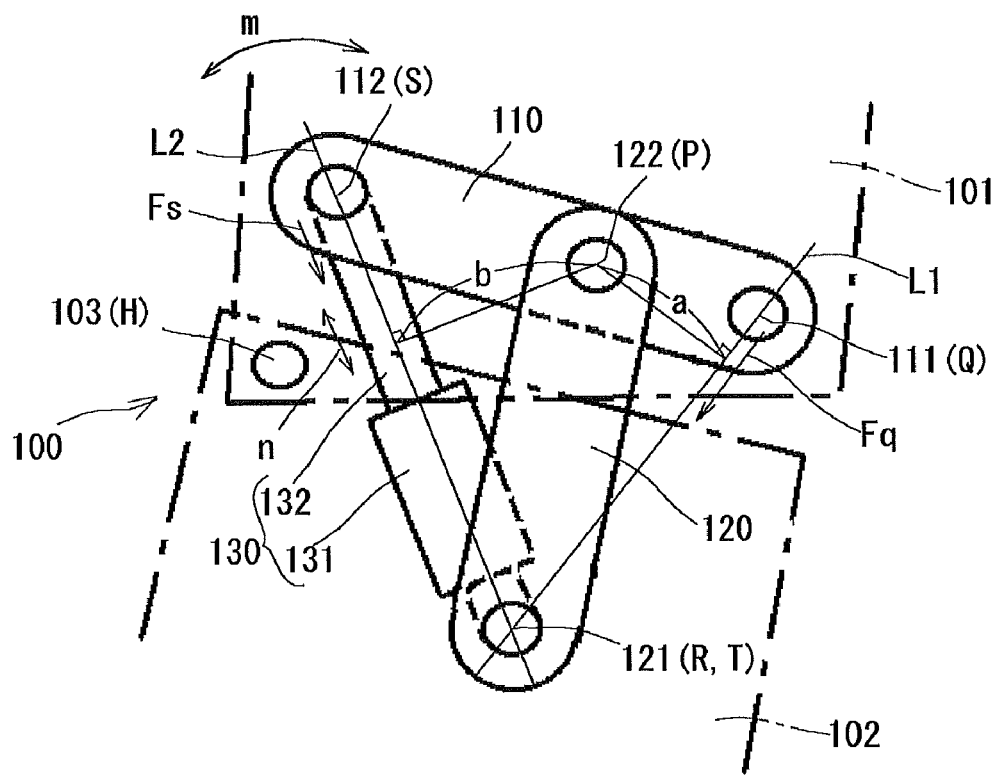
FIG. 1 is a schematic view of a seat adjustment mechanism according to an embodiment disclosed here.

A seat adjustment mechanism 100 according to an embodiment will be explained with reference to a schematic view of FIG. 1. First and second seat members 101 and 102 are connected to each other by a hinge shaft 103 (connecting point H) so that ends of each of the first and second seat members 101 and 102 are relatively rotatable in a direction indicated by an arrow "m" shown in FIG. 1. Further, the seat adjustment mechanism 100 is arranged between the first and second seat members 101 and 102 while including first and second link members 110 and 120 and a drive member 130. The drive member 130 includes a drive device 131 and an extending and retracting device 132 driven by the drive device 131 and linearly reciprocating in the direction indicated by an arrow "n" shown in FIG. 1. The seat adjustment mechanism 100 is configured so that the extending and retracting device 132 driven by the drive device 131 linearly reciprocates to rotate the first and second link members 110 and 120 accordingly, thereby rotating the first seat member 101 relative to the second seat member 102 and adjusting the rotation angle of the first seat member 101.

As illustrated in FIG. 1, the first link member 110 includes a right end (first end) rotatably connected to the first seat member 101 by a hinge shaft 111 and a left end (second end) rotatably connected to an bottom end of the extending and retracting device 132 by a hinge shaft 112. The second link member 120 includes a lower end (first end) rotatably connected to the second seat member 102 by a hinge shaft 121 and an upper end (second end) rotatably connected between the right and left ends of the first link member 110 by a hinge shaft 122. Further, the drive device 131 is rotatably connected to the second seat member 102 by the hinge shaft 121 to which the second link member 120 is connected.

The hinge shaft 122 serves as a connecting point P between the first and second link members 110 and 120. The hinge shaft 111 serves as a connecting point Q between the first seat member 101 and the first link member 110. The hinge shaft 121 serves as a connecting point R between the second seat member 102 and the second link member 120. Further, the hinge shaft 112 serves as a connecting point S between the first link member 110 and the extending and retracting device 132. The connecting point Q and the connecting point S are adapted to be fixed respectively at rear and front portions of the first seat member in an inner side thereof. In addition, the hinge shaft 121 serves as a connecting point T between the second seat member 102 and the drive device 131. The connecting point T (hinge shaft 121) corresponds to the connecting point R. Moreover, when a line linearly the connecting points Q and R is determined as a line L1 and a line linearly the connecting points S and R (T) is determined as a line L2, the first link member 110 is connected to the second link member 120 and the extending and retracting device 132 in such a way that a ratio a/b of a distance "a" from the connecting point P perpendicular to the line L1 relative to a distance "b" from the connecting point P perpendicular to the line L2 is less than one.

The operation and operational effect of the seat adjustment mechanism 100 configured as above will be described below. When the extending and retracting device 132 extends, the connecting point Q rotates in a clockwise direction seen in FIG. 1. Accordingly, the first seat member 101 tilts rearward (in the clockwise direction) around the connecting point H. When the extending and retracting device 132 retracts, the connecting point Q rotates in a counterclockwise direction seen in FIG. 1. Accordingly, the first seat member 101 tilts forward (in the counterclockwise direction) around the connecting point H. For example, when a large load is applied to the first seat member 101, a load Fq acting toward the connecting point R between the second seat member 102 and the second link member 120 is applied to the connecting point Q between the first seat member 101 and the first link member 110. At this time, a moment Fq*a, which is obtained by multiplying the load Fq by the distance "a" between the connecting point P and the line L1, acts on the connecting point P between the first link member 110 and the second link member 120. Further, a load Fs =Fq*a/b, which is obtained by dividing the moment Fq*a by the ratio a/b, is applied to the connecting point S between the first link member 110 and the extending and retracting device 132.

As described above, the ratio a/b that is the ratio of the distance "a" between the connecting point P and the line L1 relative to the distance "b" between the connecting point P and the line L2 is set so as to be less than one. Accordingly, the load Fs applied to the connecting point S between the first link member 110 and the extending and retracting device 132 is smaller than the load Fq applied to the connecting point Q between the first seat member 101 and the first link member 110. Consequently, even when the large load is applied to the first seat member 101, only a small load is applied to the extending and retracting device 132. As a result, the extending and retracting device 132 may be designed to be a simple configuration that is resistant to a small load, leading to cost and weight reductions. In addition, the extending and retracting device 132 generates a small driving force to thereby rotate the first seat member 101 relative to the second seat member 102. Accordingly, the extending and retracting device 132 having the simple configuration generating a small driving force is obtained, therefore realizing the cost and weight reductions.

Moreover, even when the extending and retracting device 132 is damaged and a tilt angle of the first seat member 101 relative to the second seat member 102 is unable to be adjusted accordingly, rotation angles of the first and second link members 110 and 120, i.e. a rotation angle of the connecting point Q between the first seat member 101 and the first link member 110, is restricted by the rotation of the first seat member 101 relative to the second seat member 102 around the connecting point H between the first and second seat member 101 and 102. Accordingly, the tilt angle of the first seat member 101 relative to the second seat member 102 is restricted. Consequently, the first seat member 101 is maintained in a predetermined position. In addition, when only such operational effect is required, the ratio a/b of the distance "a" between the connecting point P and the line L1 relative to the distance "b" between the connecting point P and the distance "b" is not necessarily less than one and may be an arbitrary value.

The seat adjustment mechanism 100 is applicable to a seat back tilting mechanism and a seat back tilting mechanism drive unit for a seat apparatus attached to a front seat for a vehicle. The seat adjustment mechanism 100 will be explained with reference to FIG. 2 to FIG. 4. In addition, longitudinal (front and rear), width (right and left), and vertical directions described hereinafter are based on the directions in the vehicle.

Figure 2:
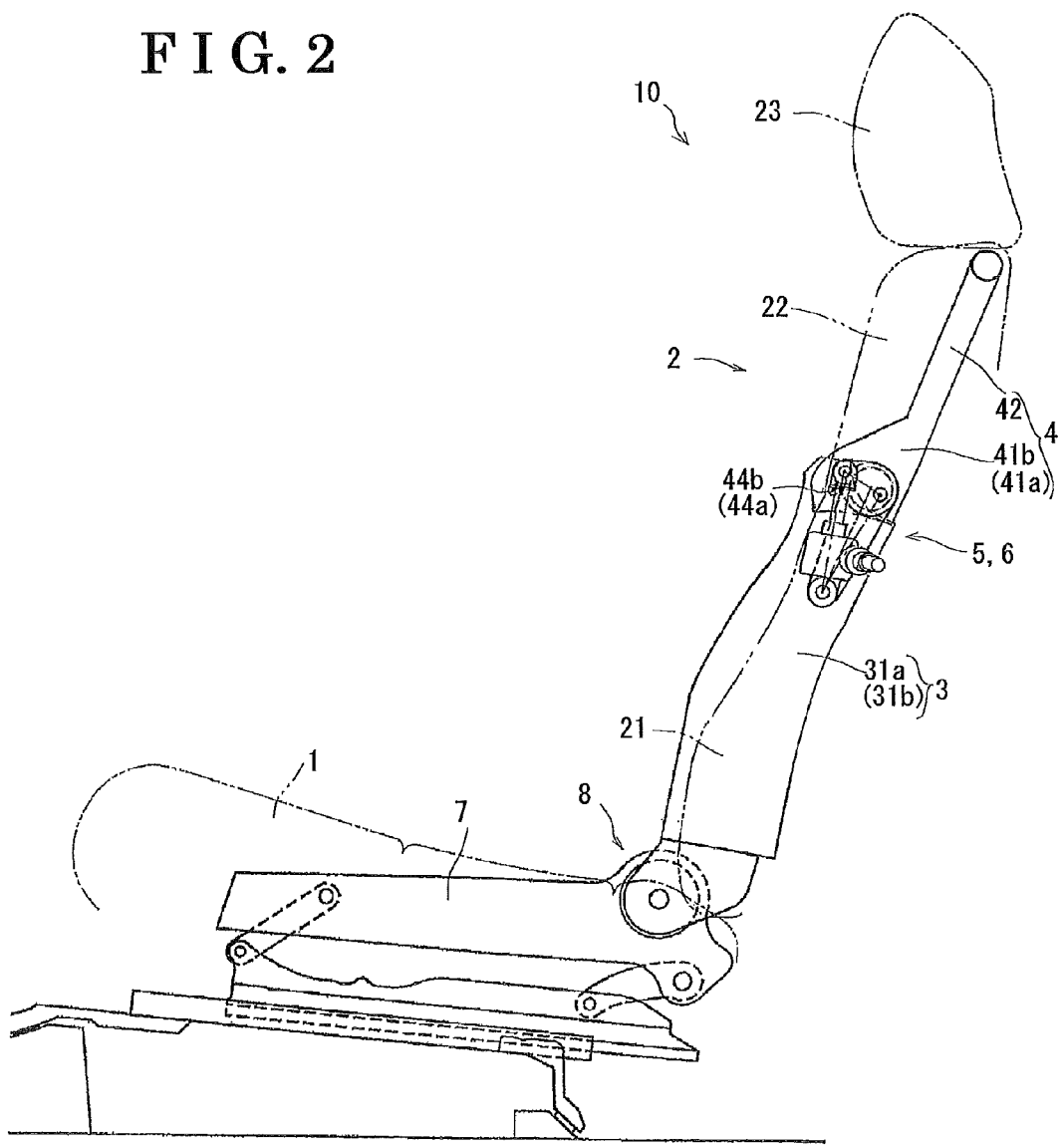
FIG. 2 is a schematic view of a seat apparatus for a vehicle where the seat adjustment mechanism shown in FIG. 1 is applied as a seat back tilting mechanism and a seat back tilting mechanism drive unit.

As illustrated in FIG. 2, a seat apparatus 10 according to the embodiment includes a seat cushion 1 and a seat back 2. The seat back 2 includes a lower seat back portion 21, an upper seat back portion 22, and a headrest 23. A lower end of the lower seat back portion 21 is supported by a rear end of the seat cushion 1, thereby enabling the lower seat back portion 21 to tilt forward and rearward in the longitudinal direction and connecting the whole seat back 2 to the seat cushion 1. A lower end of the upper seat back portion 22 is supported by an upper end of the lower seat back portion 21, thereby enabling the upper seat back portion 22 to tilt forward and rearward in the longitudinal direction. The headrest 23 is supported by an upper end of the upper seat back portion 22 so as to extend and retract in the vertical direction.

Seat back tilting mechanisms 5 (see FIG. 3 for details) and a seat back tilting mechanism drive unit 6 (see FIG. 4 for details) are arranged between the lower seat back portion 21 and the upper seat back portion 22. The seat back tilting mechanisms 5 serves to tilt the upper seat back portion 22 forward and rearward relative to the lower seat back portion 21. The seat back tilting mechanism drive unit 6 serves to drive the seat back tilting mechanisms 5 to tilt the upper seat back portion 22 forward and rearward relative to the lower seat back portion 21. That is, the seat back tilting mechanisms 5 are driven by the seat back tilting mechanism drive unit 6, thereby rotating or moving the upper seat back portion 22 including the headrest 23 forward and rearward.

Detailed explanations of components of the seat apparatus 10 will be described as follows. A side frame mechanism 3 is arranged within the lower seat back portion 21 of the seat back 2. An upper cross-member 4 is arranged within the upper seat back portion 22 so as to be located at an upper side of the side frame mechanism 3. The side frame mechanism 3 includes side frame body portions 31a and 31b and a side frame connecting member 32 connecting respective upper ends of the side frame body portions 31a and 31b (see FIGS. 3 and 4 for details). Each of the side frame body portions 31a and 31b is formed in a plate shape while serving as the second seat member 102. The side frame body portions 31a and 31b are respectively arranged at both ends of the lower seat back portion 21 in the width direction so as to face each other. A lower end of each of the side frame body portions 31a and 31b is fixed to a reclining mechanism 8. The reclining mechanism 8 is supported by a rear end of a seat cushion frame 7 arranged within the seat cushion 1 so as to tilt forward and rearward.

The upper cross-member 4 includes upper cross-member body portions 41a and 41b and a pipe frame 42. The upper cross-member body portions 41a and 41b each forming a plate shape and each serving as the first seat member 101 are respectively arranged at both ends of the upper seat back portion 22 in the width direction so as to face each other. The pipe frame 42 is provided between respective upper ends of the upper cross-member body portions 41a and 41b so as to connect therebetween. Headrest holding portions 42a of a headrest holding mechanism are arranged at an upper portion of the pipe frame 42 (see FIG. 3 and FIG. 4 for details). The headrest holding mechanism holds the headrest 23 to extend and retract in the vertical direction.

The upper cross-member body portions 41a and 41b are rotatably connected to the side frame body portions 31a and 31b by rotating hinges 44a and 44b, respectively. The seat back tilting mechanisms 5 are arranged respectively between the upper cross-member body portion 41a and the side frame body portion 31a and between the upper cross-member body portion 41b and the side frame body portion 31b. The seat back tilting mechanisms 5 have the same configuration to tilt the upper cross-member body portions 41a and 41b relative to the side frame body portions 31a and 31b, respectively. The seat back tilting mechanism drive unit 6 is arranged at the side frame connecting member 32. The seat back tilting mechanisms 5 are driven by the seat back tilting mechanism drive unit 6, thereby tilting the upper cross-member body portions 41a and 41b relative to the side frame body portions 31a and 31b, respectively.

Figure 3:
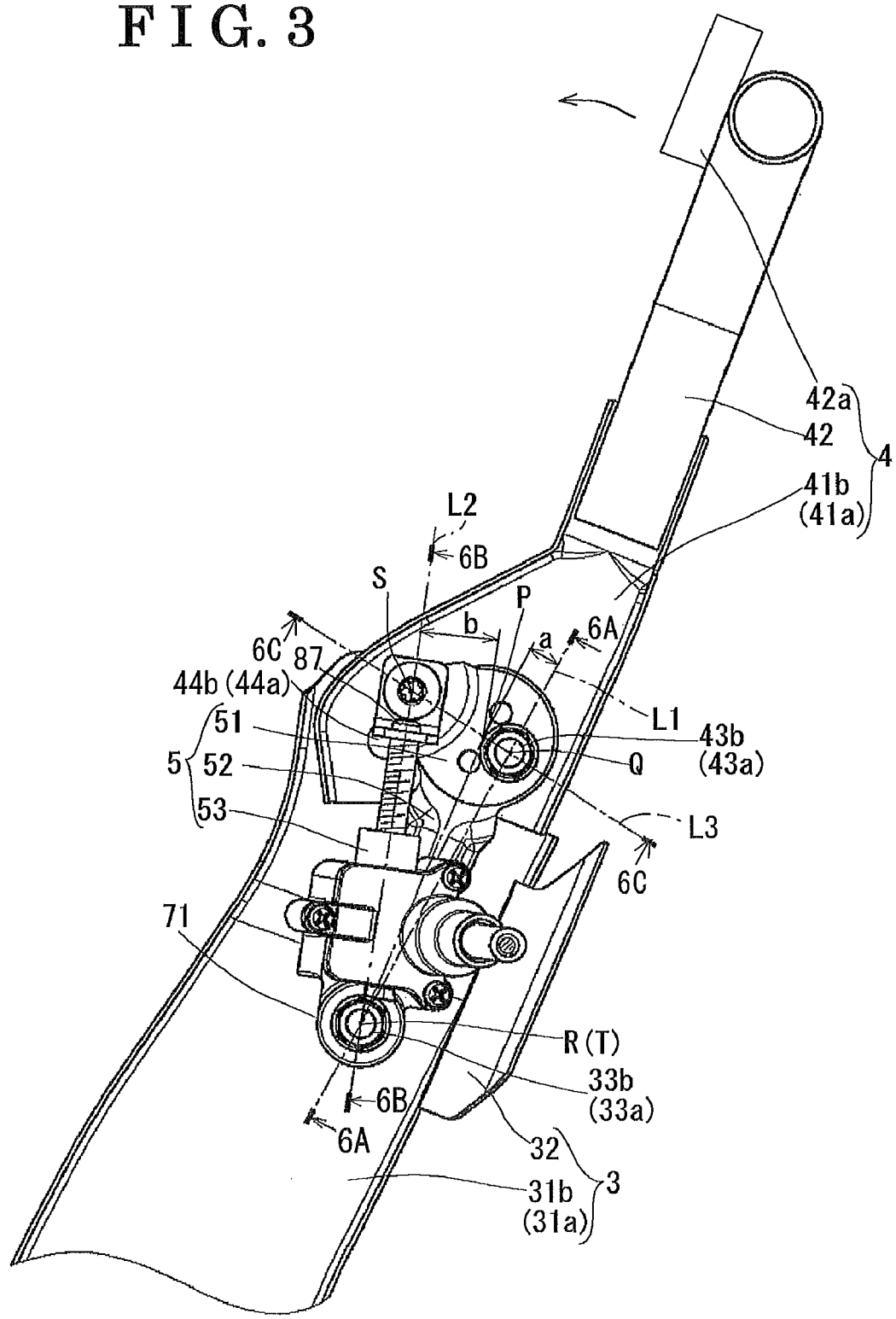
FIG. 3 is a schematic view illustrating a configuration of components forming the seat back tilting mechanism of the seat apparatus shown in FIG. 2.
Figure 4:
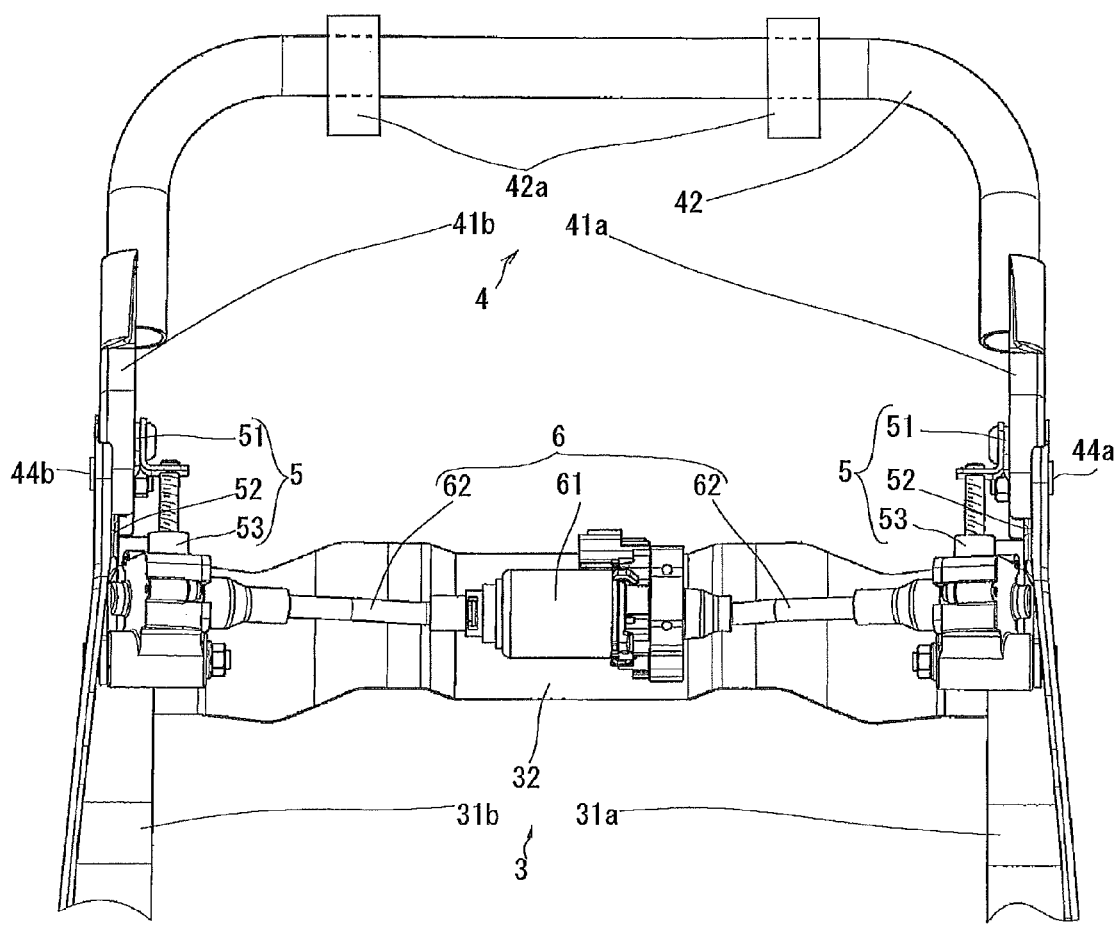
FIG. 4 is a schematic view illustrating a configuration of components forming the seat tilting mechanism drive unit of the seat apparatus shown in FIG. 2.
Figure 5:
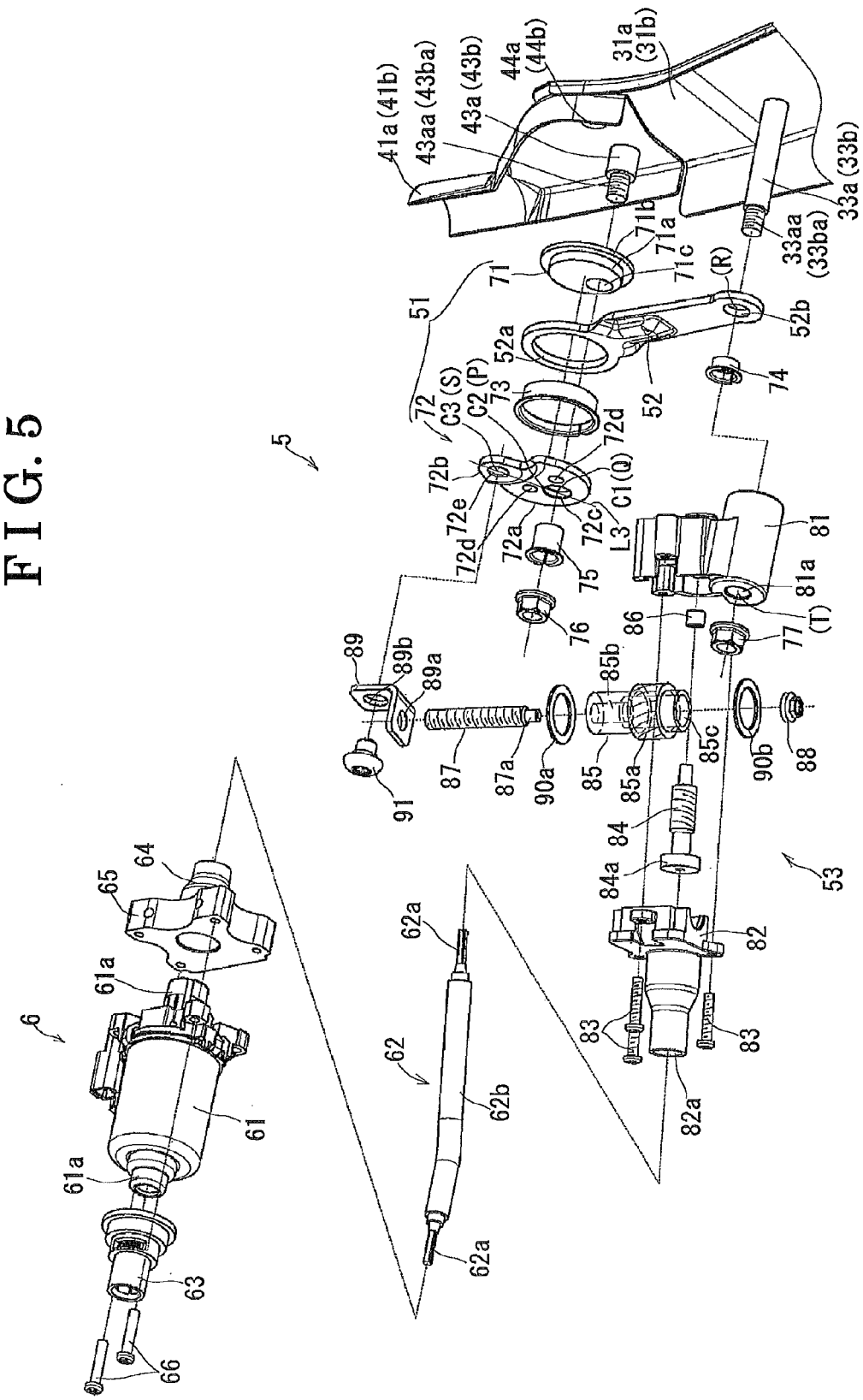
FIG. 5 is an exploded perspective view of the seat back tilting mechanism shown in FIG. 3 and the seat back tilting mechanism drive unit shown in FIG. 4.

As shown in FIG. 3, each of the seat back tilting mechanisms 5 includes a lever link 51 connecting between the side frame body portion 31b (31a) and the upper cross-member body portion 41b (41a), a fulcrum link 52, and a screw gear mechanism 53 connected to the lever link 51 and the fulcrum link 52. As illustrated in FIG. 4, the seat back tilting mechanism drive unit 6 includes a motor 61 fixed at an intermediate portion of the side frame connecting member 32 and flexible cables 62 connected to both ends of a shaft of the motor 61, respectively, and to the screw gear mechanism 53. The lever link 51 serves as the first link member 110 and the fulcrum link 52 serves as the second link member 120. Further, the screw gear mechanism 53 serves as the extending and retracting device 132. A gear case 81, a nut 77, an internally threaded hole 85b of a worm wheel 85, a feed screw 87, a stopper nut 88, an L-shaped bracket 89, a stepped screw 91, and the like that are shown in FIG. 5 form the screw gear mechanism 53 while a worm shaft 84 and a gear portion 85a of the worm wheel 85 shown in FIG. 5, and the like are not included in the extending and retracting device 132. Furthermore, the motor 61, the flexible cables 62, the worm shaft 84, the gear portion 85a of the worm wheel 85, and the like form the drive device 131.

The lever link 51 as will be described in detail below is not a general arm link but is formed to be an approximately disc-shaped link. First and second eccentric portions are formed at the lever link 51 so as to be radially deviated away from the center thereof and oppositely arranged from each other. The first eccentric portion of the lever link 51 is connectable to an upper attachment shaft 43a (43b) of the upper cross-member body portion 41a (41b) while the second eccentric portion of the lever link 51 is connectable to the feed screw 87 of the gear screw mechanism 53. The fulcrum link 52 as will be described in detail below is formed to be an approximately arm-shaped link while including a first end portion having a ring-shape and a second end portion formed to be connectable to a lower attachment shaft 33a (33b) of the side frame body portion 31a (31b) and to the gear case 81 of the screw gear mechanism 53. The lever link 51 is rotatably supported on an inner circumferential surface of the first end portion of the fulcrum link 52.

A rotation center point of the lever link 51 corresponds to the connecting point P with the fulcrum link 52. The lever link 51 includes a first eccentric point (at a rear side of the seat back 2 in FIG. 3) of the first eccentric portion deviated away from the rotation center point and a second eccentric point (at a front side of the seat back 2 in FIG. 3) of the second eccentric portion deviated away from the rotation center point. The first eccentric point of the lever link 51 corresponds to the connecting point Q with the upper cross-member body portion 41b (41a) while the second eccentric point of the lever link 51 corresponds to the connecting point S with the screw gear mechanism 53. Further, the second end portion of the fulcrum link 52 corresponds to the connecting point R with the side frame body portion 31b (31a). Furthermore, the connecting point R equals to the connecting point T between the side frame body portion 31b (31a) and the screw gear mechanism 53 under the above-mentioned example.

The connecting points Q and S of the lever link 51 are set as follows. A line linearly the connecting point R and set to have the distance "a" radially away from the connecting point P toward the rear side of the seat back 2 is determined as the line L1. A line linearly the connecting point R and set to have the distance "b" (>a; longer than the distance "a") radially away from the connecting point P toward the front side of the seat back 2 is determined as the line L2. Further, when a line linearly passing the connecting point P from the front side toward the rear side of the seat back 2 is determined as a line L3, an intersection point between the line L1 and the line L3 is the connecting point Q and an intersection point between the line L2 and the line L3 is the connecting point S. Furthermore, the ratio a/b (the ratio of the distance "a" from the connecting point P to the line L1 relative to the distance "b" from the connecting point P to the line L2) is set to be less than one. Accordingly, even when the load Fq applied to the connecting point Q is large, the load Fs applied to the connecting point S is small in consideration of a moment force.

Thus, the shorter the distance "a" relative to the distance "b" is, the smaller the load Fs applied to the connecting point S is. Under such condition, when the lever link 51 is configured so as to be a usual arm link, a hinge is required to connect the lever link 51 and the fulcrum link 52 to each other. Accordingly, the shorter the distance "a" relative to the distance "b" is, the closer the hinge is to a connecting portion between the lever link 51 and the upper cross-member 41b (41a). Accordingly, the hinge interferes with the connecting portion between the lever link 51 and the upper cross-member 41b (41a), therefore limiting the reduction of the distance "a" relative to the distance "b". However, in the embodiment, the lever link 51 is formed to be an approximately disc-shaped link and supported by the first end portion of the fulcrum link 52, therefore not being required to be connected to the fulcrum link 52 by the hinge. Thus, when the lever link 51 formed to be the approximately disc-shaped link is applied, the distance "a" relative to the distance "b" is set to be shorter and the load Fs applied to the connecting point S is further reduced as compared with the lever link 51 formed to be the usual arm link is applied.

Moreover, since the seat back tilting mechanism drive unit 6 is arranged at the intermediate portion of the side frame connecting member 32 and connected to the seat back tilting mechanisms 5 by means of the flexible cables 62, the motor 61 does not protrude from the upper seat back portion 22 and the seat back tilting mechanisms 5 are arranged respectively at rear portions of inner side faces of the upper seat back portion 22. Accordingly, the distance "b" relative to the distance "a" is set to be further longer, therefore further minimizing the load Fs applied to the connecting point S even when the load Fq applied to the connecting point Q is large.

In addition, as shown in FIG. 3, the lever link 51 is rotatably connected to the upper cross-member body portion 41b (41a) around the upper attachment shaft 43b (43a). The fulcrum link 52 is connected to the side frame body portion 31b (31a) around the lower attachment shaft 33b (33a) so as to rotate in accordance with the rotation of the lever link 51. The upper cross-member body portion 41b (41a) is rotatably connected to the side frame body portion 31b (31a) around the rotating hinge 44b (44a).

As the configuration described above, the upper cross-member body portion 41b (41a) tilts forward and rearward in the longitudinal direction relative to the side frame body portion 31b (31a) in accordance with the rotation of the lever link 51 and the fulcrum link 52. At this time, rotation angles of the lever link 51 and the fulcrum link 52, i.e. a rotation angle of the upper attachment shaft 43b (43a), is restricted by the rotation of the upper cross-member body portion 41b (41a) around the rotating hinge 44b (44a). More specifically, the rotation angle of the upper cross-member body portion 41b (41a) is limited to approximately 180 degrees from an approximately lowermost point to an approximately uppermost point of the fulcrum link 52. For example, even when the screw gear mechanism 53 is damaged to therefore disable the adjustment of a tilt angle of the upper seat back portion 22 relative to the lower seat back portion 21, the tilt angle of the upper seat back portion 22 is restricted and maintained in a predetermined position.

Figure 6:
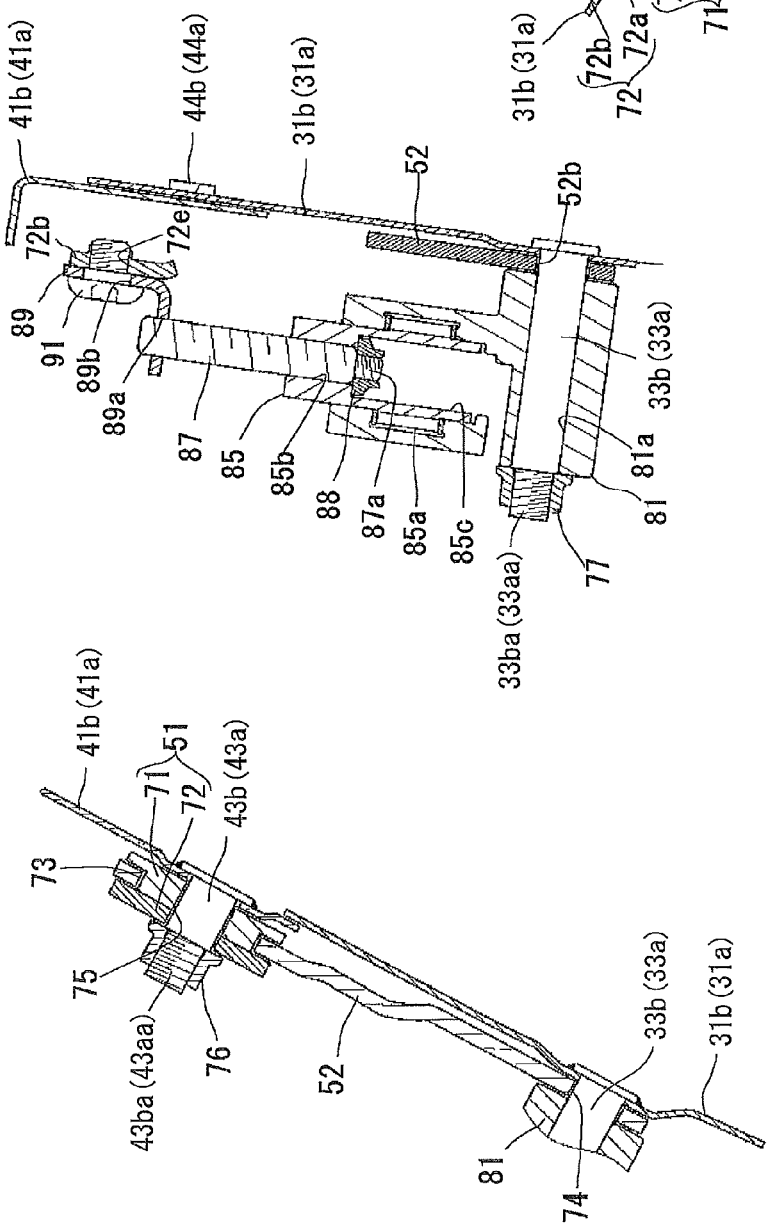
FIG. 6A is a cross-sectional view taken along the line 6A-6A in FIG. 3.
FIG. 6B is a cross-sectional view taken along the line 6B-6B in FIG. 3.
FIG. 6C is a cross-sectional view taken along the line 6C-6C in FIG. 3.

Hereinafter, detailed configurations of the seat back tilting mechanism 5 and the seat back tilting mechanism drive unit 6 will be explained with reference to FIG. 5 and FIG. 6. The lever link 51 includes an eccentric ring 71 and an arm member 72 welded to each other. The eccentric ring 71 is formed into a disc-like shape while including a circular center portion 71a and a collar portion 71b. The circular center portion 71a is formed so as to have an outer diameter that is approximately the same size as an internal diameter of a bush 73 inserted into a large-diameter attachment hole 52a of the fulcrum link 52, which will be described below. An eccentric hole 71c (connecting point Q) is perforated in the circular center portion 71a as to be radially deviated from the rotation center point (connecting point Q) thereof and to penetrate therethrough. The collar portion 71b is formed on a first end face of the circular center portion 71a so as to extend radially outwardly from an outer circumferential periphery of the first end face.

The arm member 72 includes a main body portion 72a and a protruding portion 72b while being formed into an approximately disc-like shape. The main body portion 72a is formed so as to have an outer diameter that is slightly larger than the outer diameter of the circular center portion 71a of the eccentric ring 71. A shaft hole 72c (connecting point Q) and two welding holes 72d are formed in the main body portion 72a so as to penetrate therethrough. The shaft hole 72c faces the eccentric hole 71c and has a diameter that is approximately the same size as a diameter of the eccentric hole 71c when the main body portion 72a and the circular center portion 71a are welded to each other. The welding holes 72d are positioned adjacent to the shaft hole 72c. The protruding portion 72b is integrally formed on an outer circumferential periphery of the main body portion 72a so as to protrude along the line L3 linearly passing from a center point C1 of the shaft hole 72c through a center point C2, which is a rotation center point of the main body portion 72a, toward a radially outward direction of the outer circumferential periphery of the main body portion 72a. An internally threaded hole 72e (connecting point S) is formed in the protruding portion 72b so as to penetrate therethrough. The internally threaded hole 72e includes a center point C3 on the line L3.

The fulcrum link 52 includes the large-diameter attachment hole 52a formed at the first end portion and a small-diameter attachment hole 52b formed at the second end portion. Flanged bushes 73 and 74 having annular shapes are inserted in the large-diameter attachment hole 52a and the small-diameter attachment hole 52b, respectively. The bushes 73 and 74 are formed by thin plates coated with a low friction material while being formed into circular tube shapes respectively having outer diameters larger than diameters of the large-diameter attachment hole 52a and the small-diameter attachment hole 52b. A portion of an outer circumferential surface of each of the bushes 73 and 74 is cut along an axial direction thereof. The bushes 73 and 74 are radially inwardly compressed against radial spring forces thereof so as to penetrate through the large-diameter attachment hole 52a and the small-diameter attachment hole 52b, respectively. Meanwhile, the bushes 73 and 74 are radially outwardly expanded due to the radial spring forces, thereby being fitted respectively into the large-diameter attachment hole 52a and the small-diameter attachment hole 52b. Furthermore, an insertion end of each of the bushes 73 and 74 is processed so as to be expanded into a flanged shape. Thus, the bushes 73 and 74 are prevented from being detached from the large-diameter attachment hole 52a and the small-diameter attachment hole 52b, respectively.

Further, the circular center portion 71a of the eccentric ring 71 is inserted in the large-diameter attachment hole 52a to which the bush 73 is fitted. The circular center portion 71a of the eccentric ring 71 and the main body portion 72a of the arm member 72 are arranged so as to face each other in such a way that the eccentric hole 71c and the shaft hole 72c are coaxially aligned with respect to each other. Furthermore, the arm member 72 is arc-welded to the large-diameter attachment hole 52a so that the welding holes 72d are closed. Then, a flanged bush 75 having an annular shape is inserted into the shaft hole 72c and the eccentric hole 71c (hereinafter, simply referred to as the shaft hole 72c). The bush 75 is formed by a thin plate covered with a low friction material so as to be a circular tube shape having an outer diameter slightly larger than the diameter of the shaft hole 72c. A portion of an outer circumferential surface of the bush 75 is cut along an axial direction thereof. The bush 75 is radially inwardly compressed against a radial spring force thereof into the shaft hole 72c so as to penetrate therethrough while being radially outwardly expanded due to the radial spring force, thereby being fitted into the shaft hole 72c. Furthermore, an insertion end of the bush 75 is processed so as to be expanded into a flanged shape, thereby preventing the bush 75 from being detached from the shaft hole 72c. Thus, the lever link 51 is rotatably connected to the fulcrum link 52.

As illustrated in FIG. 5, the upper attachment shaft 43a (43b) is arranged on an inner side surface of the upper cross-member body portion 41a (41b) so as to protrude therefrom toward an interior side of the vehicle. The lower attachment shaft 33a (33b) is arranged on an inner side surface of the side frame body portion 31a (31b). An externally threaded portion 43aa (43ba) is formed at an end of the upper attachment shaft 43a (43b). The externally threaded portion 43aa (43ba) has a diameter slightly smaller than the diameter of the shaft hole 72c of the lever link 51. The external thread portion 43aa (43ba) is inserted into the shaft hole 72c of the lever link 51 and a nut 76 is screwed with the externally threaded portion 43aa (43ba) so as to be tightened thereto.

As shown in FIG. 5, an eternally threaded portion 33aa (33ba) is formed at an end of the lower attachment shaft 33a (33b). The externally threaded portion 33aa (33ba) has an outer diameter slightly smaller than a diameter of a shaft hole 81a perforated on the gear case 81 as will be described below. The lower attachment shaft 33a (33b) is inserted into the small-diameter attachment hole 52b of the fulcrum link 52 and the shaft hole 81a of the gear case 81 so as to penetrate therethrough. Further, a nut 77 is screwed with the externally threaded portion 33aa (33ba) of the lower attachment shaft 33a (33b) so as to be tightened thereto. Thus, as shown in FIG. 6A (view taken along the line 6A-6A of FIG. 3), the lever link 51 is connected to the upper cross-member body portion 41b (41a) so as to rotate about the upper attachment shaft 43b (43a) and the fulcrum link 52 is connected to the side frame body portion 31b (31a) so as to rotate about the lower attachment shaft 33b (33a) in accordance with the rotation of the lever link 51.

As shown in FIG. 5, the screw gear mechanism 53 includes the gear case 81, a gear case cover 82, the worm shaft 84, the worm wheel 85, and other components that are accommodated within a space formed by the gear case 81 and the gear case cover 82. The worm wheel 85 is positioned to be asymmetrical with respect to the worm shaft 84. As described above, the shaft hole 81a into which the lower attachment shaft 33a (33b) is inserted is perforated on the gear case 81. A cable hole 82a is perforated on the gear case cover 82. A first end of each of the flexible cable 62 is inserted into the cable hole 82a. The gear case 81 and the gear case cover 82 are tightened and fixed to each other with screws 83.

A bearing 84a is attached to a first end of the worm shaft 84. The first end of the flexible cable 62 is fitted into the bearing 84a. The bearing 84a attached to the first end of the worm shaft 84 is pressed into the cable hole 82a of the gear case cover 82. Further, a second end of the worm shaft 84 is inserted into a tubular bush 86 pressed into the gear case 81. Thus, the worm shaft 84 is rotatably supported in the space defined between the gear case 81 and the gear case cover 82. The gear portion 85a meshing with the worm shaft 84 is arranged on an outer circumferential surface of the worm wheel 85. The internally threaded hole 85b meshing with the feed screw 87 and a tubular hole 85c continuously connected with the internally threaded hole 85b are formed on an inner circumferential surface of the worm wheel 85. The tubular hole 85c has an inner diameter larger than an outer diameter of the stopper nut 88 preventing the feed screw 87 from being detached from the internally threaded hole 85b.

An externally threaded portion 87a having a small diameter is provided at a first end of the feed screw 87. The stopper nut 88 is screwed with the externally threaded portion 87a. A second end of the feed screw 87 is inserted into a hole 89a, which is perforated in a first surface of the L-shaped bracket 89 so as to be welded to the L-shaped bracket 89. The first end of the feed screw 87 is inserted through the internally threaded hole 85b to the tubular hole 85c of the worm wheel 85 and screwed with the tubular hole 85c. Further, the stopper nut 88 is screwed with the externally threaded portion 87a of the feed screw 87 so as to be tightened thereto. Since the tubular hole 85c has the inner diameter larger than the outer diameter of the stopper nut 88, the stopper nut 88 is movable in the tubular hole 85c and thereby supports the feed screw 87 to be linearly movable in accordance with a rotation of the worm wheel 85 within a predetermined distance as far as the movement of the feed screw 87 is restricted by the stopper nut 88.

Washers 90a and 90b are fitted to both end faces of the gear portion 85a of the worm wheel 85 to which the feed screw 87 is attached. Further, the gear portion 85a is accommodated within the gear case 81 so as to mesh with the worm shaft 84. Accordingly, as illustrated in FIG. 6B (view taken along the line 6B-6B of FIG. 3), the worm wheel 85 is rotatably supported within the space defined by the gear case 81 and the gear case cover 82. Further, the stepped screw 91 is inserted into a hole 89b, which is perforated in a second surface of the L-shaped bracket 89, and screwed with the internally threaded hole 72e formed in the protruding portion 72b of the arm member 72. Thus, as shown in FIG. 6C (view taken along the line 6C-6C of FIG. 3), the L-shaped bracket 89 fixed to the second end of the feed screw 87 is fixed to the protruding portion 72b of the arm member 72 into which the upper attachment shaft 43b (43a) is inserted. Accordingly, when the worm wheel 85 rotates in accordance with the rotation of the worm shaft 84, the feed screw 87 linearly moves within the predetermined distance. As a result, the lever link 51 is rotated within a predetermine angle to thereby rotate the fulcrum link 52 within the predetermine angle.

As illustrated in FIG. 5, a cable fixing member 63 is arranged at a first end of the motor 61 and a motor fixing member 65 including a cable fixing portion 64 is arranged at a second end of the motor 61 so as to be fixed thereto with screws 66. The motor fixing member 65 is fixed to the intermediate portion of the side frame connecting member 32. The flexible cable 62 includes a core member 62*a* rotating and transmitting the rotating torque to the worm shaft 84 and an outer tube 62*b* having a cylindrical shape. The outer tube 62*b* covers and protects the core member 62*a* while not rotating. The first end of the flexible cable 62 is inserted into the cable hole 82*a* of the gear case cover 82 and the core member 62*a* provided at the first end of the flexible cable 62 is fitted into the bearing 84*a* of the worm shaft 84. Meanwhile, a second end of the flexible cable 62 is inserted into the cable fixing portion 64 (cable fixing member 63) of the motor fixing member 65 and the core member 62*a* provided at the second end of the flexible cable 62 is fitted into a motor shaft 61*a* of the motor 61. Accordingly, a driving force of the motor 61 is transmitted from the motor shaft 61*a* via the core member 62*a* of the flexible cable 62 to the worm shaft 84. Thus, as described above, the motor 61, the cable fixing member 63, and the motor fixing member 65 of the seat back tilting mechanism drive unit 6 are arranged at the center of the vehicle (at the intermediate portion of the side frame connecting member 32). Further, the flexible cables 62 and the seat back tilting mechanisms 5 are provided in the seat apparatus 10 so as to have a symmetric configuration in the width direction of the vehicle.

Figure 7:
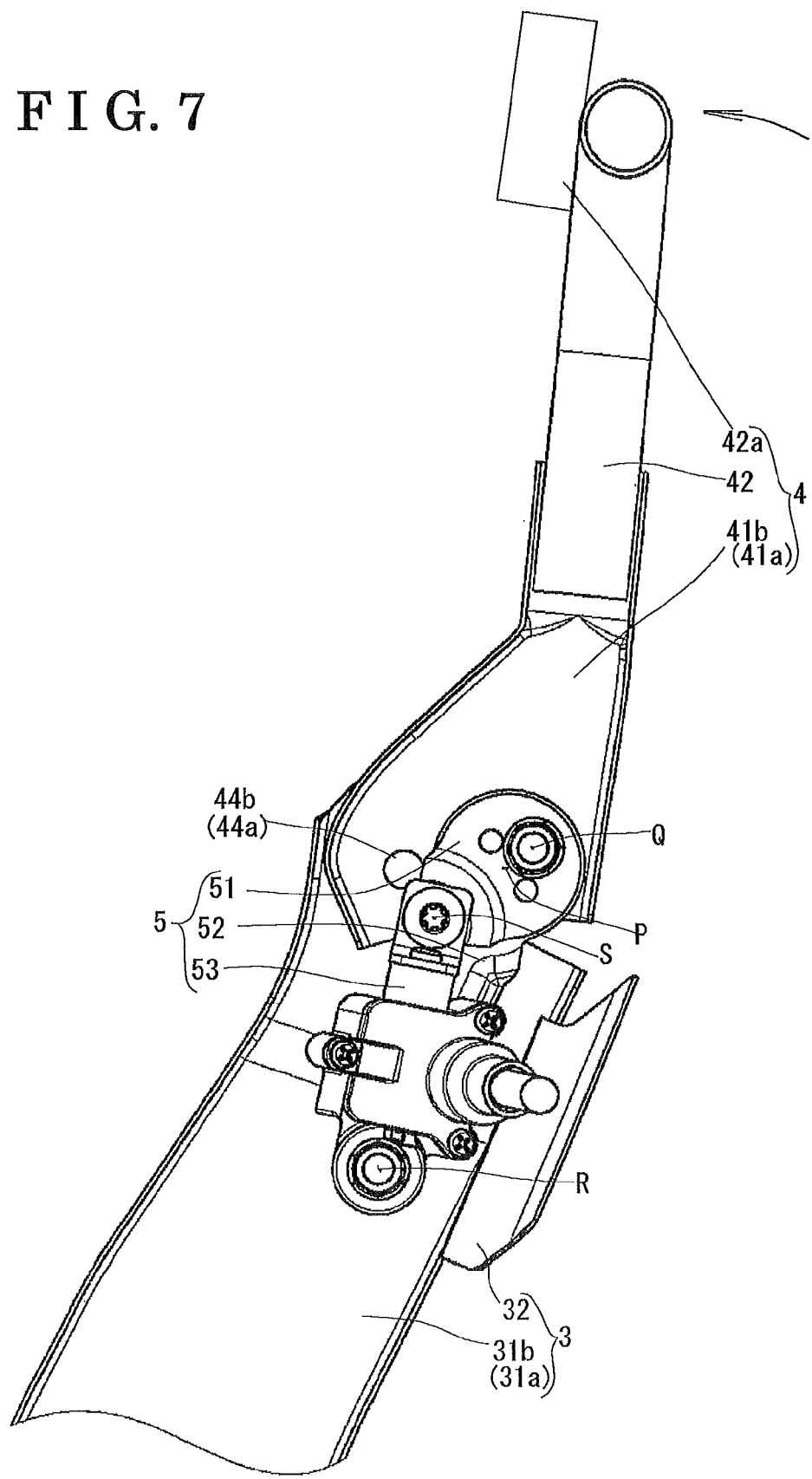
FIG. 7 is a schematic view illustrating a condition where the seat back tilting mechanism shown in FIG. 3 is in operation.

The operation of the seat apparatus 10 configured as described above will be explained as follows. When an occupant presses an operation switch in order to tilt the upper seat back portion 22 of the seat back 2, the motor 61 is driven by a motor drive unit so as to rotate in a predetermined direction. Afterward, the flexible cables 62 arranged at right and left sides of the motor 61 and extending in the width direction are rotated by an output of the motor 61 to thereby rotate the worm shaft 84 of each of the seat back tilting mechanisms 5. As a result, the worm wheel 85 engaging with the worm shaft 84 is rotated while reducing the number of rotations of the motor 61. Then, the feed screw 87 engaging with the internally threaded hole 85*c* of the worm wheel 85 moves axially to rotate the lever link 51 accordingly, thereafter rotating the fulcrum link 52. Thus, the upper cross-member body portions 41*a* and 41*b* are tilted forward (in the counterclockwise direction in FIG. 3). Consequently, the upper seat back portion 22 is moved in accordance with the tilting movement of the upper cross-member body portions 41*a* and 41*b* from the position shown in FIG. 3 to the position shown in FIG. 7. Meanwhile, when the tilted position of the upper seat back portion 22 relative to the lower seat back portion 21 is required to be returned to an initial position, the occupant presses the switch to rotate the motor 61 in an opposite direction of the above-mentioned predetermined direction.

Thus, according to the seat apparatus 10 including the seat back tilting mechanisms 5 and the seat back tilting mechanism drive unit 6 of the embodiment, even when the large load Fq is applied to the connecting point Q between the upper cross-member body portion 41*b* (41*a*) and the lever link 51 via the upper seat back portion 22 in case of a collision of the vehicle, the load Fs applied to the connecting point R between the screw gear mechanism 53 and the side frame body portion 31*b* (31*a*) is minimized. Accordingly, the screw gear mechanism 53 does not require a strong configuration as far as having a configuration resistant to the small load Fs. Consequently, weight and cost reductions of the seat back tilting mechanism 5 and the seat back tilting mechanism drive unit 6 are realized.

Further, the screw gear mechanism 53 generates a small driving force; therefore, a large force is applied to the connecting point Q between the lever link 51 and the upper cross-member body portion 41*b* (41*a*) to tilt the upper seat back portion 22. Under this condition, the screw gear mechanism 53 does not require an additional speed reduction mechanism that is able to realize a large speed reduction, leading to the weight and cost reduction of the seat back tilting mechanism 5 and the seat back tilting mechanism drive unit 6. Furthermore, the lever link 51, the fulcrum link 52, and the seat back tilting mechanisms 5 are arranged at inner side faces of the side frame body portions 31*a* and 31*b* of the side frame mechanism 3, respectively, while not protruding from the upper seat back portion 22, therefore reducing a longitudinal thickness of the seat back 2. In addition, since an operating distance of the screw gear mechanism 53, i.e. a moving distance of the feed screw 87, increases relative to the tilt angle of the upper seat back portion 22, the tilt angle of the upper seat back portion 22 may be finely adjusted. Accordingly, the high-quality seat back tilting mechanism 5 and the high-end seat back tilting mechanism drive mechanism 6 that generate few vibrations are realized. Moreover, the lever link 51, the fulcrum link 52, and the seat back tilting mechanisms 5 are arranged at the rear portions of the inner side faces of the upper seat back portion 22 and the seat back tilting mechanism drive unit 6 is provided at the upper seat back portion 22 so as not protrude therefrom. Accordingly, the distance "b" may be further increased relative to the distance "a" to thereby further minimize the load Fs applied to the connecting point S even when the load Fq applied to the connecting point Q is large.

Further, for example, even when the screw gear mechanism 53 is damaged to therefore disable the adjustment of the tilt angle of the upper seat back portion 22, the rotation angles of the lever link 51 and the fulcrum link 52, i.e. the rotation angle of the upper attachment shaft 43*a* (43*b*), is restricted by the rotation of the upper cross-member body portions 41*a* and 41*b* around the rotating hinges 44*a* and 44*b*. Accordingly, the tilt angle of the upper seat back portion 22 is restricted and maintained in the predetermined position. In addition, when only such operational effect is required, the ratio a/b of the distance "a" from the connecting point P to the line L1 relative to the distance "b" from the connecting point P to the line L2 is not necessarily less than one and may be an arbitrary value.

Figure 8:
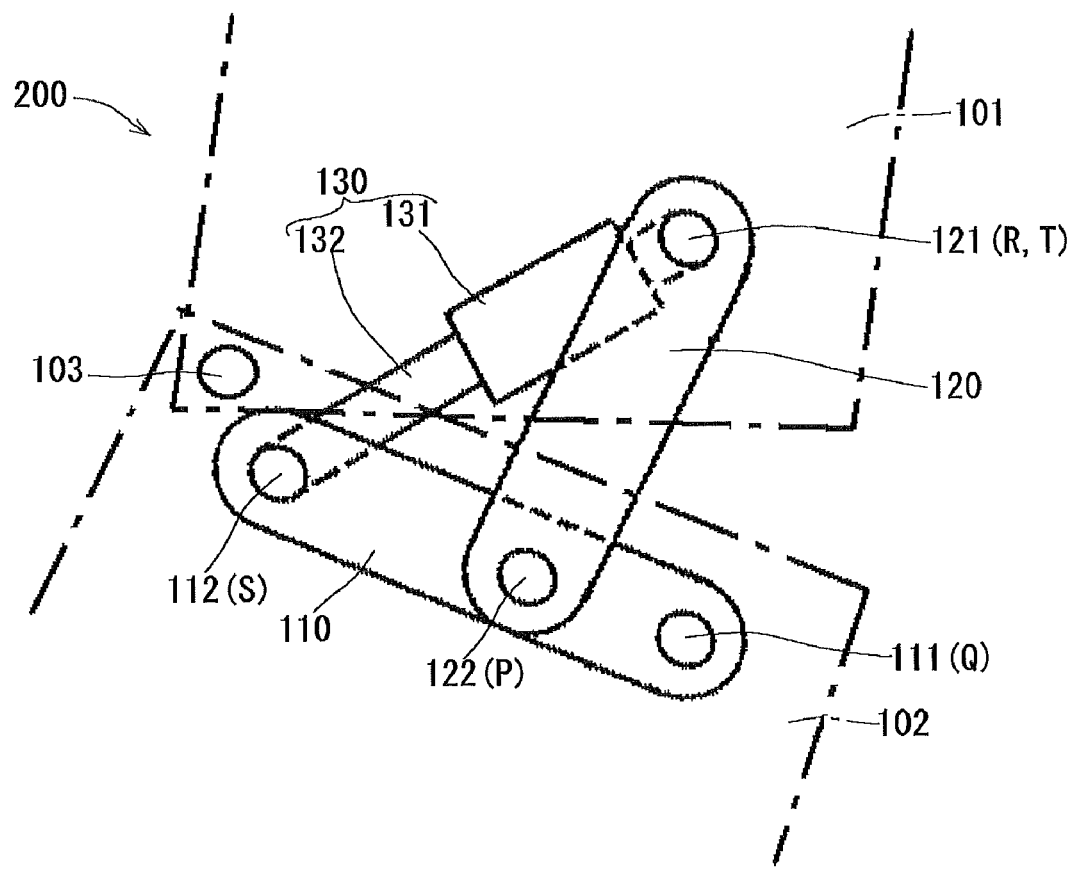
FIG. 8 is a schematic view of a first modified example of the seat adjustment mechanism shown in FIG. 1.

FIG. 8 is a schematic view of a seat adjustment mechanism 200 that is a first modified example of the seat adjustment mechanism 100 shown in FIG. 1. The same numbers are applied to the same configurations of the seat adjustment mechanism 200 as those of the seat adjustment mechanism 100 and detailed explanations of such configurations will be omitted. The seat adjustment mechanism 200 is arranged in a vertically inverse direction relative to the arrangement of the seat adjustment mechanism 100 shown in FIG. 1. That is, the first end of the first link member 110 is rotatably connected to the second seat member 102 by the hinge shaft 111 (connecting point Q) while the second end of the first link member 110 is rotatably connected to the bottom end of the extending and retracting device 132 by the hinge shaft 112 (connecting point S). The first end of the second link member 120 is rotatably connected to the first seat member 101 by the hinge 121 (connecting point R, T) while the second end of the second link member 120 is connected at a point between the first and second ends of the first link member 110 by the hinge shaft 122 (connecting point P). Further, the drive device 131 is rotatably connected to the first seat member 101 by the same hinge shaft 121 as the second link member 120. The seat adjustment mechanism 200 configured as described above performs a similar operational effect to the operational effect of the seat adjustment mechanism 100 shown in FIG. 1.

Figure 9:
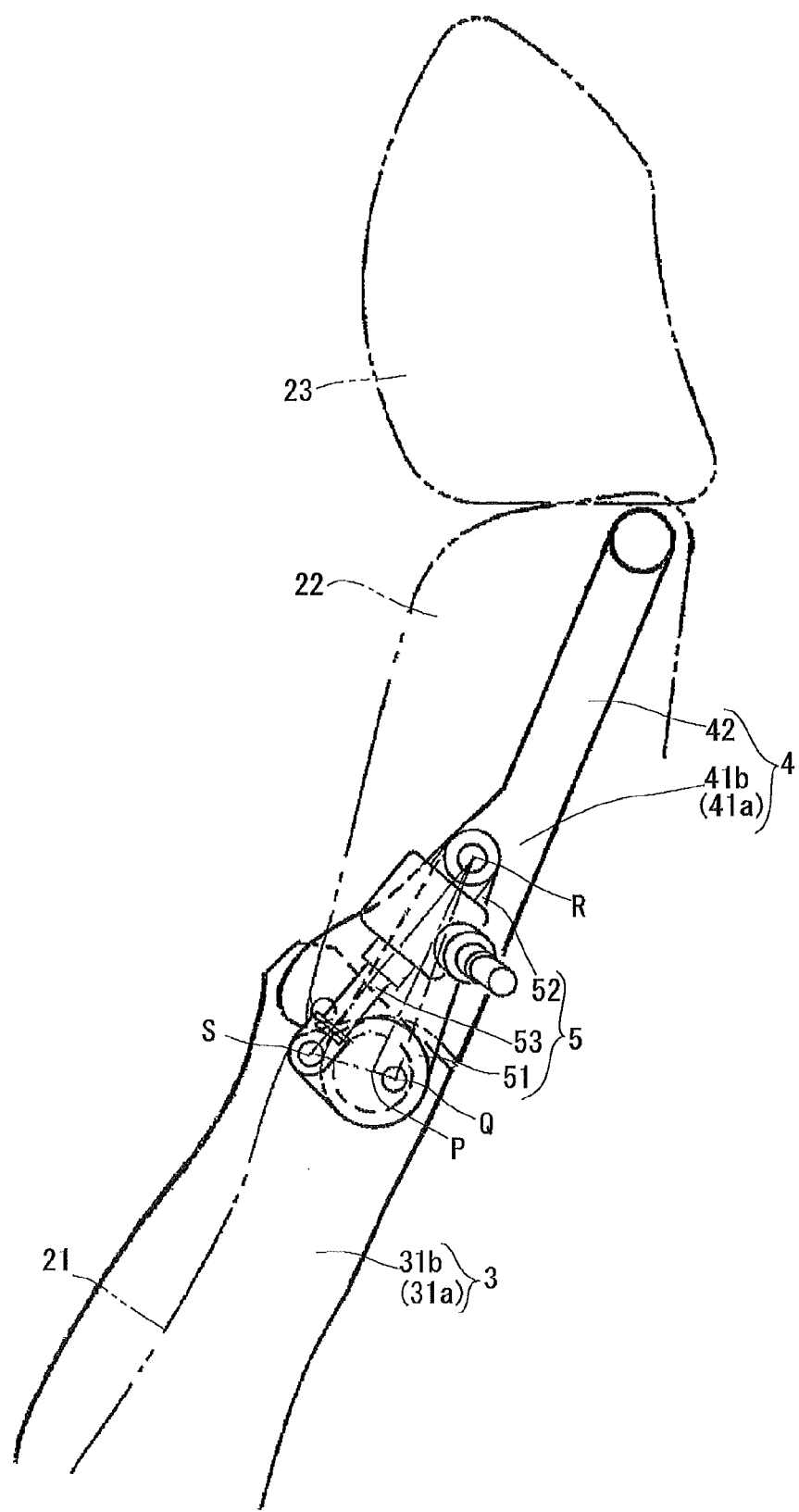
FIG. 9 is a schematic view illustrating a case where the seat adjustment mechanism shown in FIG. 8 is applied to the seat back tilting mechanism and the seat back tilting mechanism drive unit of the seat apparatus.

FIG. 9 is a schematic view illustrating a case where the seat adjustment mechanism 200 shown in FIG. 8 is applied to the seat back tilting mechanism 5 and the seat back tilting mechanism drive unit 6 for a seat apparatus for a vehicle. The same numbers are applied to the same configurations of the seat apparatus as those of the seat apparatus 10 shown in FIG. 3 and detailed explanations of such configurations will be omitted. In the case shown in FIG. 9, the upper attachment shaft 43a (43b) (connecting point R) of the upper cross-member body portion 41a (41b) is inserted into the small-diameter attachment hole 52b of the fulcrum link 52 so as to penetrate therethrough while the lower attachment shaft 33a (33b) (connecting point Q) is inserted into the shaft hole 72c of the lever link 51 and the shaft hole 81a of the gear case 81 so as to penetrate therethrough. Further, a connecting member for connecting the upper cross-member body portions 41a and 41b is additionally arranged between the upper cross-member body portions 41a and 41b so as to connect therebetween and the motor 61 of the seat back tilting mechanism drive unit 6 is arranged at the connecting member. Thus, when the seat back tilting mechanism 5 is arranged in the vertically inversed direction relative to the arrangement shown in FIG. 1, a similar operational effect to the operational effect of the seat apparatus 10 shown in FIG. 3 is obtained.

Figure 10:
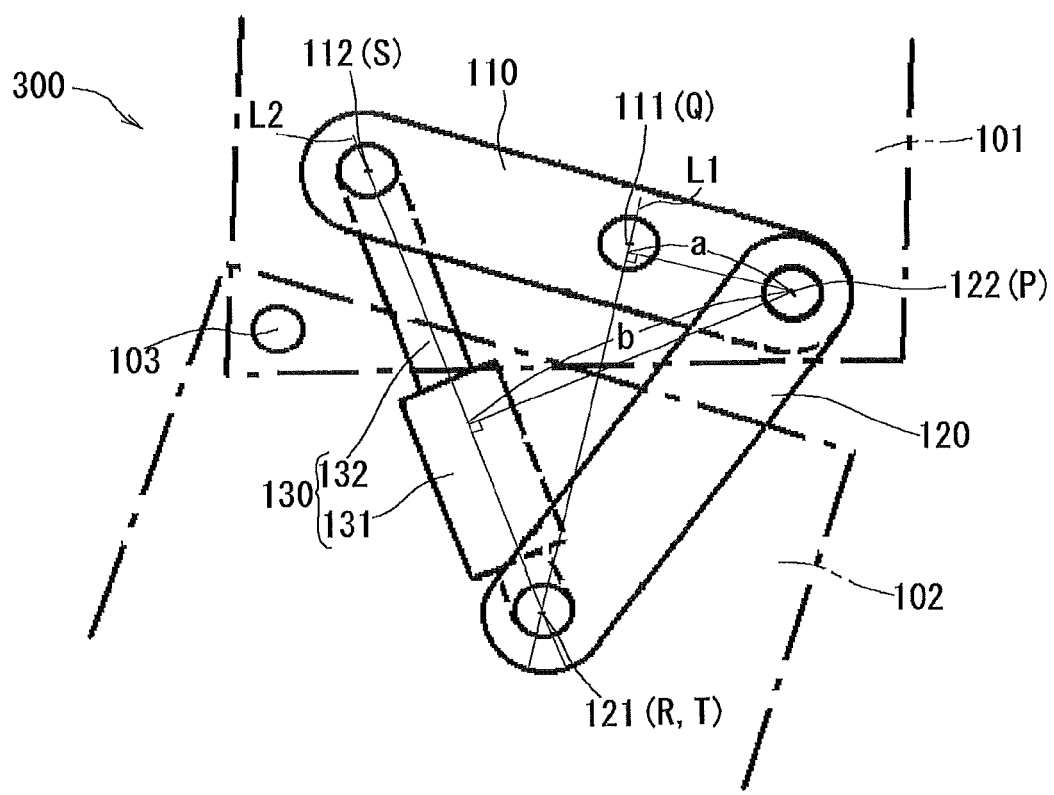
FIG. 10 is a schematic view of a second modified example of the seat adjustment mechanism shown in FIG. 1.

FIG. 10 is a schematic view illustrating a seat adjustment mechanism 300 that is a second modified example of the seat adjustment mechanism 100 shown in FIG. 1. The same numbers are applied to the same configurations of the seat adjustment mechanism 300 shown in FIG. 10 as those of the seat adjustment mechanism 100 and detailed explanations of such configurations will be omitted. According to the seat adjustment mechanism 300, the connecting point P (hinge shaft 122) between the first and second link members 110 and 120 and the connecting point Q (hinge shaft 111) between the first link member 110 and the first seat member 101 are in a reversed arrangement with respect to the arrangement of the seat adjustment mechanism 100 shown in FIG. 1. That is, in FIG. 10, the connecting point P is arranged at the rear side of the seat back 2 and the connecting point Q is arranged at the front side of the seat back 2. The first end of the second link member 120 is rotatably connected to the first end of the first link member 110 by the hinge shaft 122 (connecting point P). The first seat member 101 is rotatably connected between the first and second ends of the first link member 110 by the hinge shaft 111 (connecting point Q). Further, the second end of the first link member 110 is rotatably connected to the bottom end of the extending and retracting device 132 by the hinge shaft 112 (connecting point S). The first end of the second link member 120 is rotatably connected to the second seat member 102 by the hinge shaft 121 (connecting point R, T). Furthermore, the drive device 131 is rotatably connected to the second seat member 102 by the same hinge shaft 121 (connecting point R, T) as the second link member 120. The seat adjustment mechanism 300 operates in a different manner from the operation of the seat adjustment mechanism 100 shown in FIG. 1. In particular, according to the seat adjustment mechanism 300, when the extending and retracting device 132 is extended, the connecting point Q rotates counterclockwise to thereby tilt the first seat member 101 forward (counterclockwise) about the connecting point H. Meanwhile, when the extending and retracting device 132 is retracted, the connecting point Q rotates clockwise to thereby tilt the first seat member 101 rearward (clockwise) about the connecting point H. The seat adjustment mechanism 300 configured as described above performs a similar operational effect to the operational effect of the seat adjustment mechanism 100 shown in FIG. 1.

Figure 11:
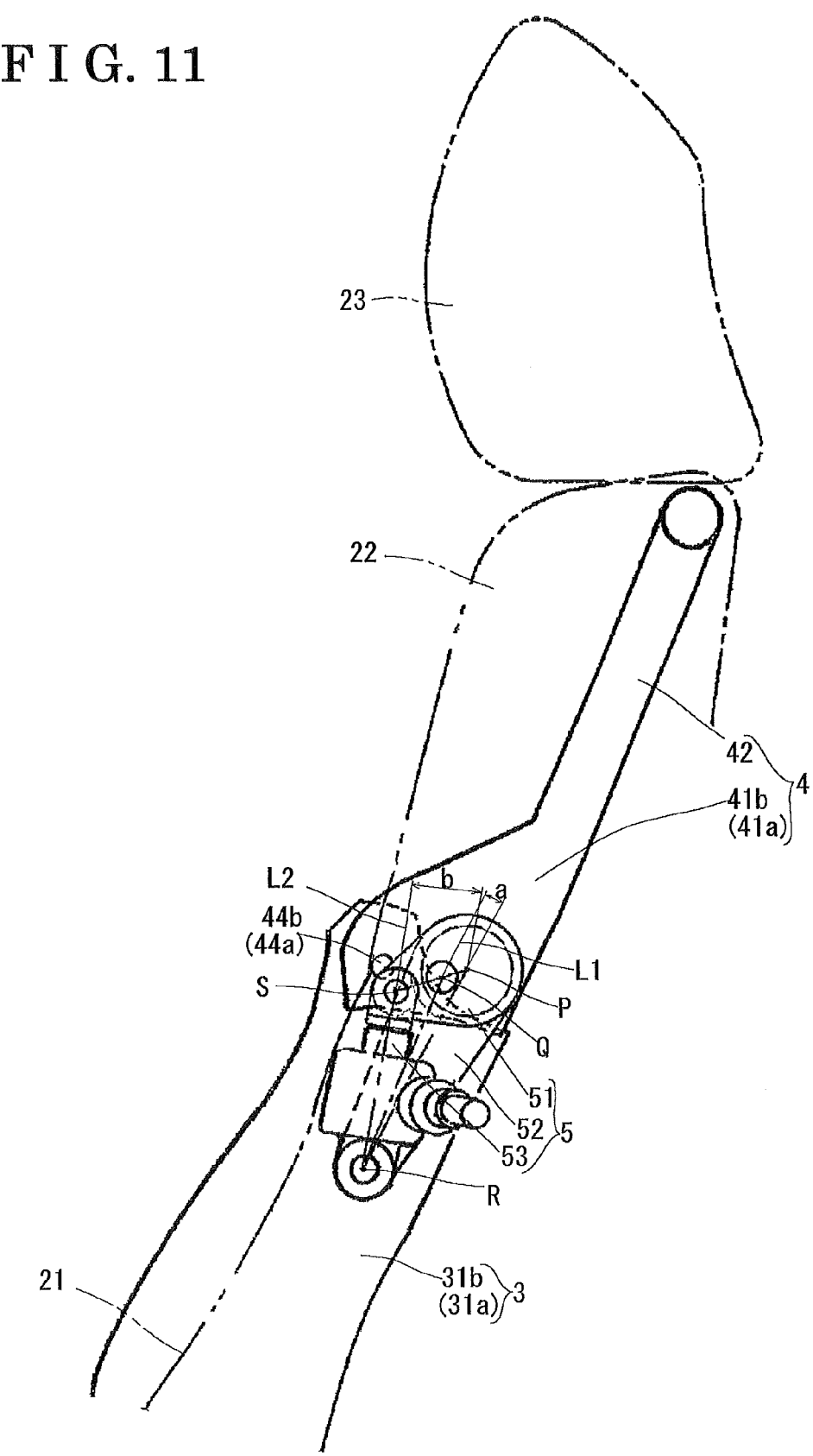
FIG. 11 is a schematic view illustrating a case where the seat adjustment mechanism shown in FIG. 10 is applied to the seat back tilting mechanism and the seat back tilting mechanism drive unit of the seat apparatus.

FIG. 11 is a schematic view illustrating a case where the seat adjustment mechanism 300 shown in FIG. 10 is applied to the seat back tilting mechanism 5 and the seat back tilting mechanism drive unit 6 for a seat apparatus for a vehicle. The same numbers are applied to the same configurations of the seat apparatus as those of the seat apparatus 10 shown in FIG. 3 and detailed explanations of such configurations will be omitted. In the case shown in FIG. 10, the connecting point Q between the lever link 51 and the upper cross-member body portion 41b (41a) is arranged closer to the front side of the seat back 2 than the connecting point P between the lever link 51 and the fulcrum link 52. Further, the connecting point S between the lever link 51 and the screw gear mechanism 53 is positioned at the front side of the seat back 2. The seat apparatus configured as described above performs a similar operational effect to that of the seat apparatus 10 shown in FIG. 3.

Figure 12:
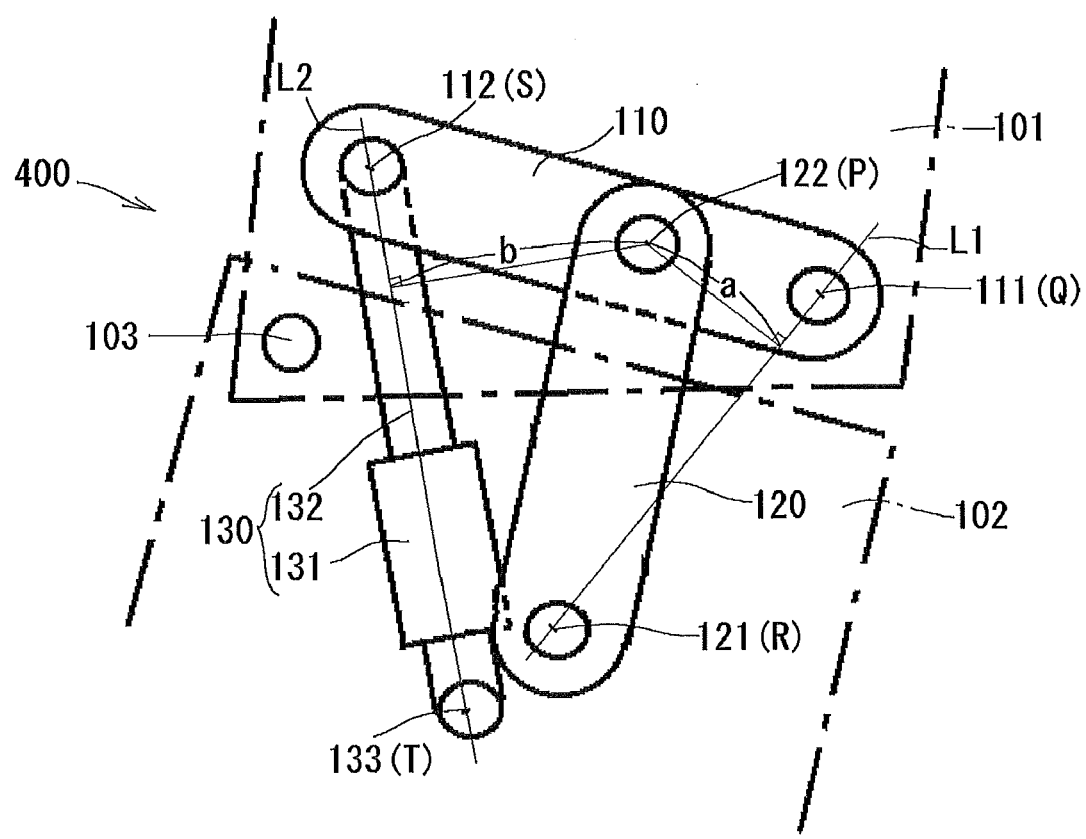
FIG. 12 is a schematic view of a third modified example of the seat adjustment mechanism shown in FIG. 1.

FIG. 12 is a schematic view of a seat adjustment mechanism 400 that is a third modified example of the seat adjustment mechanism 100 shown in FIG. 1. The same numbers are applied to the same configurations of the seat adjustment mechanism 400 as those of the seat adjustment mechanism 100 and detailed explanations of such configurations will be omitted. The seat adjustment mechanism 400 is different from the seat adjustment mechanism 100 shown in FIG. 1 in that the connecting point R between the second link member 120 and the second seat member 102 and the connecting point T between the drive device 131 and the second seat member 102 are arranged separately from each other. That is, the drive device 131 is rotatably connected to the second seat member 102 by the hinge shaft 133 (connecting point T). The seat adjustment mechanism 400 configured as described above performs a similar operating effect to that of the seat adjustment mechanism 100 shown in FIG. 1.

Figure 13:
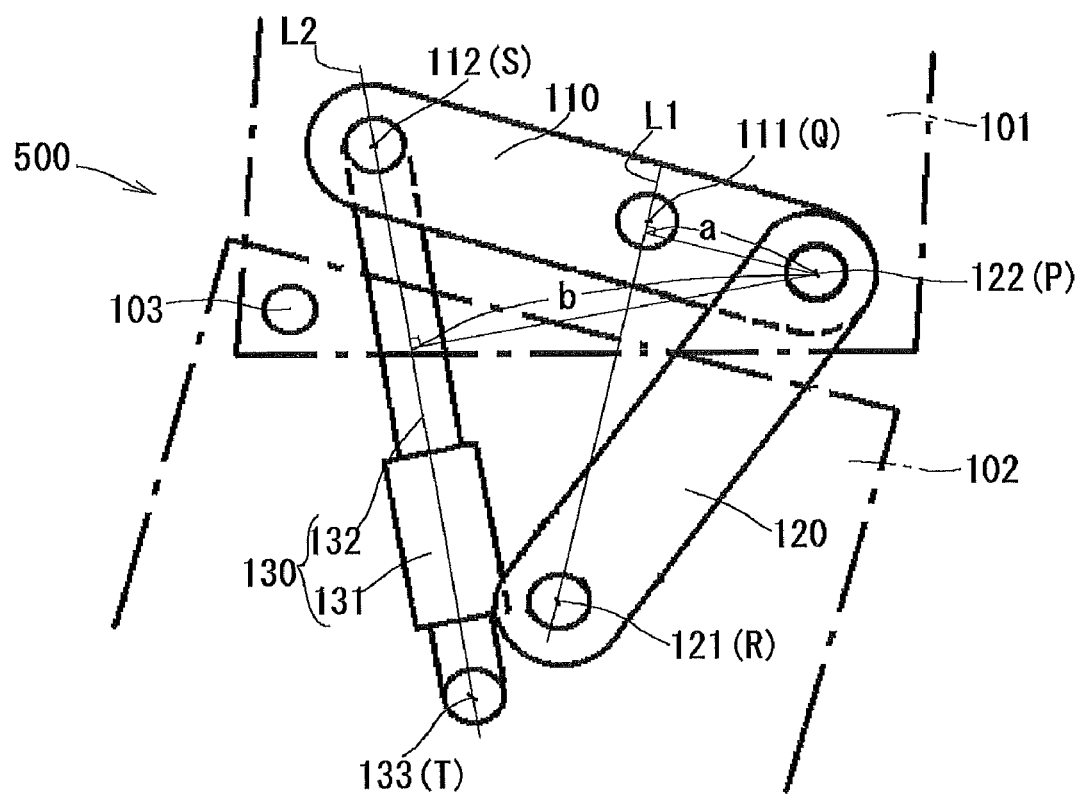
FIG. 13 is a schematic view of a modified example of the seat adjustment mechanism shown in FIG. 10.

FIG. 13 is a schematic view of a seat adjustment mechanism 500 that is a modified example of the seat adjustment mechanism 300 shown in FIG. 10. The same numbers are applied to the same configurations of the seat adjustment mechanism 500 as those of the seat adjustment mechanism 300 and detailed explanations of such configurations will be omitted. According to the seat adjustment mechanism 500, the connecting point P (hinge shaft 122) between the first and second link members 110 and 120 and the connecting point Q (hinge shaft 111) between the first link member 110 and the first seat member 101 are in a reversed arrangement with respect to the arrangement in the seat adjustment mechanism 100 shown in FIG. 1. That is, the connecting point P is arranged at the rear side of the seat back 2 and the connecting point Q is arranged at the front side of the seat back 2. Moreover, the seat adjustment mechanism 500 is different from the configuration of the seat adjustment mechanism 300 shown in FIG. 10 in that the connecting point R between the second link member 120 and the second seat member 102 and the connecting point T between the drive device 131 and the second seat member 102 are arranged separately from each other. That is, the first end of the second link member 120 is rotatably connected to the first end of the first link member 110 by the hinge shaft 122 (connecting point P). The first seat member 101 is rotatably connected between the first and second ends of the first link member 110 by the hinge shaft 111 (connecting point Q). Further, the second end of the first link member 110 is rotatably connected to the bottom end of the extending and retracting device 132 by the hinge shaft 112 (connecting point S). The first end of the second link member 120 is rotatably connected to the second seat member 102 by the hinge shaft 121 (connecting point R). Furthermore, the drive device 131 is rotatably connected to the second seat member 102 by the hinge shaft 133 (connecting point T). The seat adjustment mechanism 500 operates in a different manner from the operation of the seat adjustment mechanism 100 shown in FIG. 1. In particular, according to the seat adjustment mechanism 500, when the extending and retracting device 132 is extended, the connecting point Q rotates counterclockwise to thereby tilt the first seat member 101 forward (counterclockwise) about the connecting point H. Meanwhile, when the extending and retracting device 132 is retracted, the connecting point Q rotates clockwise to thereby tilt the first seat member 101 rearward (clockwise) about the connecting point H. The seat adjustment mechanism 500 configured as described above performs a similar operational effect to the operational effect of the seat adjustment mechanism 300 shown in FIG. 1.

Figure 14:
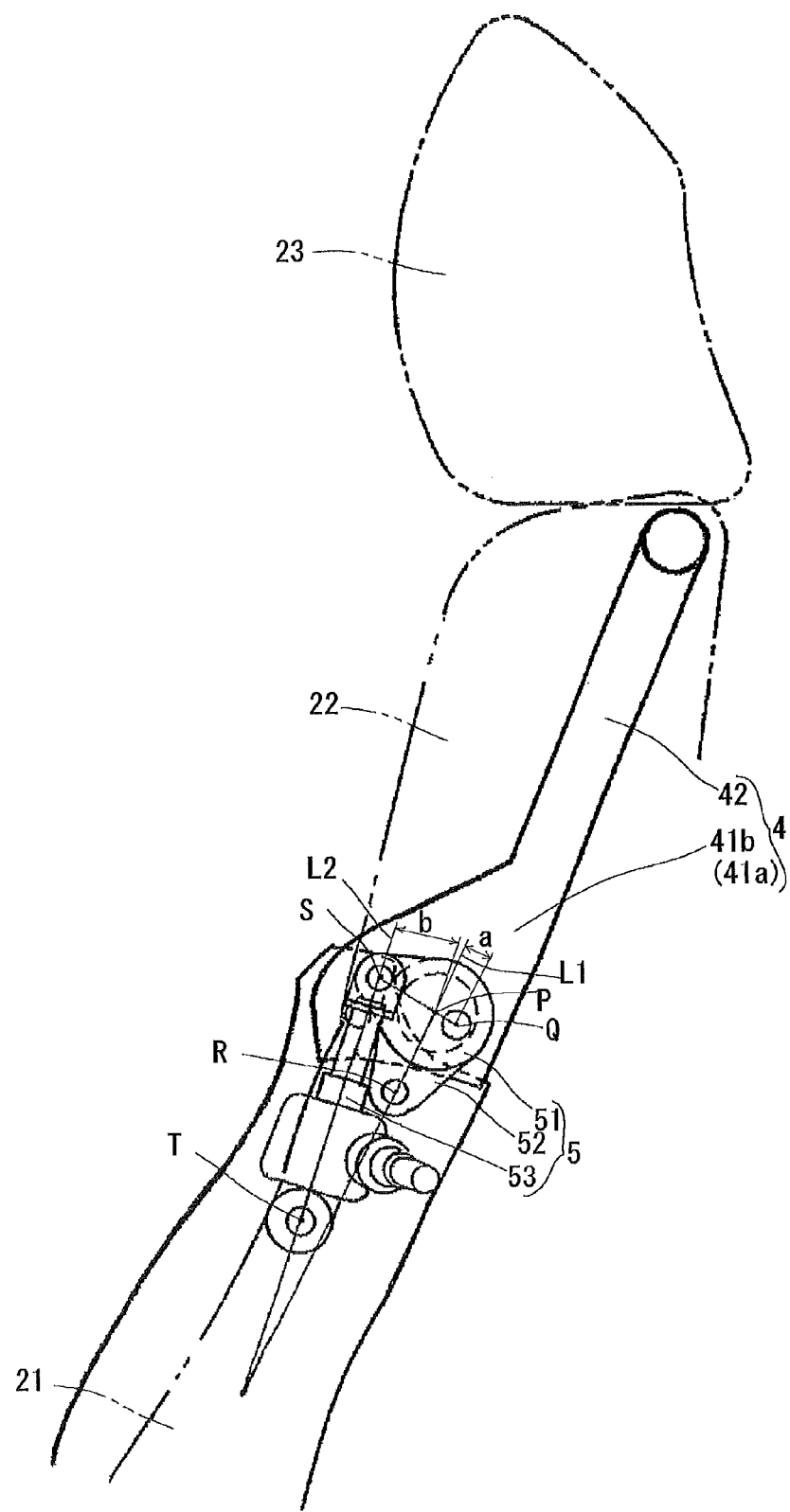
FIG. 14 is a schematic view illustrating a case where the seat adjustment mechanism shown in FIG. 12 is applied to the seat back tilting mechanism and the seat back tilting mechanism drive unit of the seat apparatus.

FIG. 14 is a schematic view illustrating a case where the seat adjustment mechanism 400 shown in FIG. 12 is applied to the seat back tilting mechanism 5 and the seat back tilting mechanism drive unit 6 for a seat apparatus for a vehicle. The same numbers are applied to the same configurations of the seat apparatus as those of the seat apparatus 10 shown in FIG. 3 and explanations of such configurations will be omitted. In the case shown in FIG. 14, the connecting point R between the fulcrum link 52 and the side frame body portion 31b (31a) and the connecting point T between the screw gear mechanism 53 and the side frame body portion 31b (31a) are arranged separately from each other. The seat apparatus configured as described above performs a similar operational effect to that of the seat apparatus 10 shown in FIG. 3. In addition, when the seat adjustment mechanism 500 shown in FIG. 13 is applied to the seat back tilting mechanism 5 and the seat back tilting mechanism drive unit 6 for the seat apparatus the seat apparatus, the similar operational effect is obtained.

Additionally, the cases where the seat adjustment mechanism 100, 200, 300, 400 is applied to the seat back tilting mechanism 5 and the seat back tilting mechanism drive unit 6 that serve to tilt the upper seat back portion 22 relative to the lower seat back portion 21 of the seat apparatus 10 are explained in examples according to the aforementioned embodiment. Alternatively, the mechanism of the seat adjustment mechanism 100, 200, 300, 400 according to the embodiment may be applicable to the reclining mechanism 8 arranged within the seat cushion 1 of the seat apparatus 10, a slide mechanism sliding the seat cushion 1 vertically and longitudinally, a seat cushion adjusting mechanism adjusting the length of the seat cushion 1, an ottoman mechanism, or the like. Moreover, the mechanism of the seat adjustment mechanism 100, 200, 300, 400 according to the embodiment may be applicable to a tilt adjusting mechanism and a lock mechanism for a steering apparatus.

As described above, the ratio a/b that is the ratio of the distance "a" between the connecting point P and the line L1 relative to the distance "b" between the connecting point P and the line L2 is set so as to be less than 1. Accordingly, the load Fs applied to the connecting point S between the lever link 51 and the screw gear mechanism 53 is smaller than the load Fq applied to the connecting point Q between the upper cross-member 4 and the lever link 51. Consequently, even when a large load is applied to the upper cross-member 4, only a small load is applied to the screw gear mechanism 53. As a result, the screw gear mechanism 53 may be designed to be a simple configuration that is resistant to a small load, leading to cost and weight reductions. In addition, the screw gear mechanism 53 generates a small driving force to thereby rotate the upper cross-member 4 relative to the side frame mechanism 3. Accordingly, the screw gear mechanism 53 having the simple configuration generating a small driving force is obtained, therefore realizing the cost and weight reductions.

According to the aforementioned embodiment, the lever link 51 is formed into a disc shape and provided with the rotation center point serving as the connecting point P with the fulcrum link 52. Further, the lever link 51 includes the connecting point Q and the connecting point R. The fulcrum link 52 is formed into an arm shape and provided with the first end serving as the connecting point R with the side frame body portion 31a, 31b and the second end to which the lever link 51 is rotatably connected.

Accordingly, a hinge is not required to connect the lever link 51 and the fulcrum link 52 to each other. Thus, when the lever link 51 having the approximately disc-shape is applied, the distance "a" relative to the distance "b" is set to be shorter and the load Fs applied to the connecting point S is further reduced as compared with the lever link 51 having the arm-shape.

According to the aforementioned embodiment, the connecting point Q and the connecting point S are adapted to be fixed respectively at the rear and front portions of the upper cross-member body portion 41a, 41b in the inner side thereof, and the upper cross-member body portion 41a, 41b of the upper cross-member 4 is connected to the side frame body portion 31a, 31b and driven to be tiltable forward relative to the side frame body portion 31a, 31b.

Accordingly, the lever link 51, the fulcrum link 52, and the screw gear mechanism 53 are arranged at the inner side face of the side frame body portion 31a, 31b of the side frame mechanism 3 while not protruding from the upper seat back portion 22, therefore reducing the longitudinal thickness of the seat back 2. In addition, since the operating distance of the screw gear mechanism 53, i.e. the moving distance of the feed screw 87, increases relative to the tilt angle of the upper seat back portion 22, the tilt angle of the upper seat back portion 22 may be finely adjusted. Accordingly, the high-quality seat adjustment mechanism 100 for the seat apparatus 10 that generates few vibrations is realized.

According to the aforementioned embodiment, wherein the lever link 51, the fulcrum link 52, and the screw gear mechanism 53 are arranged between the side frame mechanism 3 and the upper cross-member 4 provided at each of both sides of the seat back 2 in the width direction of the vehicle. The motor 61 is arranged at the intermediate portion of the side frame connecting member 32 connecting between the side frame body portions 31a and 31b of the side frame mechanisms 3 arranged at the both sides of the seat back 2. The motor 61 simultaneously drives the screw gear mechanisms 53 arranged at the both sides of the seat back 2.

Accordingly, the lever link 51, the fulcrum link 52, and the screw gear mechanism 53 are arranged at the rear portion of the inner side face of the upper seat back portion 22 and the motor 61 is provided at the upper seat back portion 22 so as not to protrude therefrom. Accordingly, the distance "b" may be further increased relative to the distance "a" to thereby further minimize the load Fs applied to the connecting point S even when the load Fq applied to the connecting point Q is large.

According to the aforementioned embodiment, the flexible cables 62 transmitting the driving force of the motor 61 to the screw gear mechanisms 53 are arranged between the motor 61 and the respective screw gear mechanisms 53.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat adjustment mechanism, adjusting an angle formed between first and second seat members rotatably connected to each other, comprising:
    a first link member adapted to be connected to the first seat member and including a first end rotatably supported by the first seat member;
    a second link member adapted to be rotatably connected to the second seat member and including a first end rotatably supported by the second seat member and a second end rotatably connected to the first link member;
    a drive device; and
    an extending and retracting device driven by the drive device and extending and retracting linearly,
    wherein one of the drive device and the extending and retracting device is rotatably connected to a second end of the first link member and the other of the drive device and the extending and retracting device is rotatably connected to the second seat member,
    wherein assuming that
    a connecting point between the first link member and the second link member is defined as a connecting point P,
    a connecting point between the first seat member and the first link member is defined as a connecting point Q,
    a connecting point between the second seat member and the second link member is defined as a connecting point R,
    a connecting point between the first link member and one of the drive device and the extending and retracting device is defined as a connecting point S,
    a connecting point between the second seat member and the other of the drive device and the extending and retracting device is defined as a connecting point T,
    a line linearly passing through the connecting points Q and R is defined as a line L1, and
    a line linearly passing through the connecting points S and T is defined as a line L2,
    the first and second link members, the first link member and one of the drive device and the extending and retracting device, and the second link and the other of the drive device and the extending and retracting device are connected to each other so that a ratio a/b of a distance "a" from the connecting point P to the line L1 relative to a distance "b" from the connecting point P to the line L2 is set to be less than one, and
    wherein the drive device is driven to move the extending and retracting device linearly to rotate the first link member relative to the second link member to thereby generate a relative rotation between the first seat member and the second seat member in order to adjust the angle between the first and second seat members.

2. The seat adjustment mechanism according to claim 1, wherein the first link member is formed into a disc shape and provided with a rotation center point serving as the connecting point P with the second link member, the first link member further including the connecting point Q and the connecting point R, and the second link member is formed into an arm shape and provided with the first end serving as the connecting point R with the second seat member and the second end to which the first link member is rotatably connected.

3. The seat adjustment mechanism according to claim 1, wherein the connecting point Q and the connecting point S are adapted to be fixed respectively at rear and front portions of the first seat member in an inner side thereof, and the first seat member is connected to the second seat member and driven to be tiltable forward relative to the second seat member.

4. A seat apparatus for a vehicle, including a seat cushion and a seat back having first and second seat members rotatably connected to each other, comprising:
    a side frame mechanism serving as one of the first and second seat members, a lower end of which is tiltably connected to a rear end of a seat cushion frame arranged within the seat cushion;
    an upper cross-member serving as the other of the first and second seat members arranged at an upper portion of the side frame mechanism; and
    a seat adjustment mechanism adjusting an angle formed between the side frame mechanism and the upper cross-member rotatably connected to each other and including:
        a first link member adapted to be connected to the first seat member and including a first end rotatably supported by the first seat member;
        a second link member adapted to be rotatably connected to the second seat member and including a first end rotatably supported by the second seat member and a second end rotatably connected to the first link member;
        a drive device; and
        an extending and retracting device driven by the drive device and extending and retracting linearly,
        wherein one of the drive device and the extending and retracting device is rotatably connected to a second end of the first link member and the other of the drive device and the extending and retracting device is rotatably connected to the second seat member,
        wherein assuming that
        a connecting point between the first link member and the second link member is defined as a connecting point P,
        a connecting point between the first seat member and the first link member is defined as a connecting point Q,
        a connecting point between the second seat member and the second link member is defined as a connecting point R,
        a connecting point between the first link member and one of the drive device and the extending and retracting device is defined as a connecting point S,
        a connecting point between the second seat member and the other of the drive device and the extending and retracting device is defined as a connecting point T,
        a line linearly passing through the connecting points Q and R is defined as a line L1, and
        a line linearly passing through the connecting points S and T is defined as a line L2,
        the first and second link members, the first link member and one of the drive device and the extending and retracting device, and the second link member and the other of the drive device and the extending and retracting device are connected to each other so that a ratio a/b of a distance "a" from the connecting point P to the line L1 relative to a distance "b" from the connecting point P to the line L2 is set to be less than one,
        wherein the drive device is driven to linearly move the extending and retracting device to rotate the first link member relative to the second link member to thereby generate a relative rotation between the first seat member and the second seat member in order to adjust the angle between the first and second seat members, and wherein the connecting point Q and the connecting point S are adapted to be fixed respectively at rear and front portions of the side frame mechanism in an inner side thereof and the upper cross-member is connected to the side frame mechanism and driven to be tiltable forward relative to the side frame mechanism.

5. The seat apparatus according to claim 4, wherein the first link member is formed into a disc shape and provided with a rotation center point serving as the connecting point P with the second link member, the first link member further including the connecting point Q and the connecting point R, and the second link member is formed into an arm shape and provided with the first end serving as the connecting point R with the second seat member and the second end to which the first link member is rotatably connected.

6. The seat apparatus according to claim 5, wherein the first and second link members and the extending and retracting device are arranged between the side frame mechanism and the upper cross-member provided at each of both sides of the seat back in a width direction of the vehicle, and wherein the drive device is arranged at an intermediate portion of a side frame connecting member connecting between side frame body portions of the side frame mechanisms arranged at the both sides of the seat back, the drive device simultaneously driving the extending and retracting devices arranged at the both sides of the seat back.

7. The seat apparatus according to claim 6, wherein flexible cables transmitting a driving force of the drive device to the extending and retracting devices are arranged between the drive device and the respective extending and retracting devices.

8. The seat apparatus according to claim 4, wherein the first and second link members and the extending and retracting device are arranged between the side frame mechanism and the upper cross-member provided at each of both sides of the seat back in a width direction of the vehicle, and wherein the drive device is arranged at an intermediate portion of a side frame connecting member connecting between side frame body portions of the side frame mechanisms arranged at the both sides of the seat back, the drive device simultaneously driving the extending and retracting devices arranged at the both sides of the seat back.

9. The seat apparatus according to claim 8, wherein flexible cables transmitting a driving force of the drive device to the extending and retracting devices are arranged between the drive device and the respective extending and retracting devices.

* * * * *